(12) United States Patent
Lang

(10) Patent No.: US 8,794,574 B2
(45) Date of Patent: *Aug. 5, 2014

(54) MICRO-ARRAY SURFACE FOR PASSIVE DRAG MODIFICATION

(75) Inventor: Amy W. Lang, Tuscaloosa, AL (US)

(73) Assignee: The Board of Trustees of the University of Alabama, Tuscaloosa, AL (US)

(*) Notice: Subject to any disclaimer, the term of this patent is extended or adjusted under 35 U.S.C. 154(b) by 898 days.

This patent is subject to a terminal disclaimer.

(21) Appl. No.: 12/593,667

(22) PCT Filed: Mar. 31, 2008

(86) PCT No.: PCT/US2008/004249
§ 371 (c)(1),
(2), (4) Date: Sep. 29, 2009

(87) PCT Pub. No.: WO2008/121418
PCT Pub. Date: Oct. 9, 2008

(65) Prior Publication Data
US 2010/0108813 A1    May 6, 2010

Related U.S. Application Data

(60) Provisional application No. 60/920,969, filed on Mar. 30, 2007, provisional application No. 60/959,047, filed on Jul. 11, 2007.

(51) Int. Cl.
*B64C 21/10* (2006.01)

(52) U.S. Cl.
USPC ...................................................... 244/200.1

(58) Field of Classification Search
USPC ............ 244/200, 200.1, 201, 198, 130, 199.4
See application file for complete search history.

(56) References Cited

U.S. PATENT DOCUMENTS

| | | | | |
|---|---|---|---|---|
| 1,922,311 A | * | 8/1933 | Lougheed | 244/200 |
| 2,899,150 A | * | 8/1959 | Ellis, Jr | 244/200 |
| 3,366,348 A | | 1/1968 | Lemoigne et al. | |
| 3,578,264 A | | 5/1971 | Kuethe | |
| 4,180,290 A | * | 12/1979 | Drews | 296/181.5 |

(Continued)

FOREIGN PATENT DOCUMENTS

| | | |
|---|---|---|
| AU | 2847692 | 5/1993 |
| AU | 658692 | 4/1995 |

(Continued)

OTHER PUBLICATIONS

Xin et al.; Study on the micro-replication of shark skin; 2008; Sci China Ser E-Tech Sci; pp. 890-896.*

(Continued)

*Primary Examiner* — Tien Dinh
*Assistant Examiner* — Michael A Fabula
(74) *Attorney, Agent, or Firm* — Meunier Carlin & Curfman, LLC

(57) ABSTRACT

A micro-array surface that provides for drag reduction. In one aspect, an aerodynamic or hydrodynamic wall surface that is configured to modify a fluid boundary layer on the surface comprises at least one array of micro-cavities formed therein the surface. In one example, the interaction of the micro-cavities with the boundary layer of the fluid can delay transition of the fluid over an identical smooth surface without the micro-cavities.

20 Claims, 12 Drawing Sheets

(56) References Cited

U.S. PATENT DOCUMENTS

| | | | |
|---|---|---|---|
| 4,284,302 A * | 8/1981 | Drews | 296/181.5 |
| 4,650,138 A * | 3/1987 | Grose | 244/130 |
| 4,736,912 A | 4/1988 | Loebert | |
| 4,750,693 A | 6/1988 | Lobert et al. | |
| 4,753,401 A * | 6/1988 | Bechert | 244/130 |
| 4,759,516 A | 7/1988 | Grose | |
| 4,830,315 A | 5/1989 | Presz, Jr. et al. | |
| 4,863,121 A * | 9/1989 | Savill | 244/200 |
| 4,865,271 A | 9/1989 | Savill | |
| 4,907,765 A | 3/1990 | Hirschel et al. | |
| 4,930,729 A | 6/1990 | Savill | |
| 4,932,612 A * | 6/1990 | Blackwelder et al. | 244/207 |
| 5,054,412 A | 10/1991 | Reed et al. | |
| 5,058,837 A | 10/1991 | Wheeler | |
| 5,114,099 A * | 5/1992 | Gao | 244/130 |
| 5,133,516 A | 7/1992 | Marentic et al. | |
| 5,171,623 A | 12/1992 | Yee | |
| 5,263,793 A | 11/1993 | Sirovich et al. | |
| 5,362,179 A | 11/1994 | Sirovich et al. | |
| 5,386,955 A | 2/1995 | Savill | |
| 5,542,630 A | 8/1996 | Savill | |
| 5,797,414 A | 8/1998 | Sirovich et al. | |
| 5,833,389 A | 11/1998 | Sirovich et al. | |
| 5,971,326 A | 10/1999 | Bechert | |
| 6,332,593 B1 | 12/2001 | Kamiadakis et al. | |
| 6,345,791 B1 | 2/2002 | McClure | |
| 6,520,455 B2 | 2/2003 | Karniadakis et al. | |
| 6,669,142 B2 | 12/2003 | Saiz | |
| 6,729,846 B1 | 5/2004 | Wobben | |
| 6,880,476 B2 | 4/2005 | Olsen et al. | |
| 7,041,363 B2 | 5/2006 | Krohmer et al. | |
| 7,059,662 B1 * | 6/2006 | Drews | 296/180.1 |
| 7,156,032 B2 | 1/2007 | Kornblit et al. | |
| 7,497,240 B2 | 3/2009 | Zimmer et al. | |
| 8,113,469 B2 * | 2/2012 | Lang | 244/200 |
| 8,124,423 B2 * | 2/2012 | Hodes et al. | 436/180 |
| 8,226,038 B2 * | 7/2012 | Smith et al. | 244/130 |
| 8,240,609 B2 * | 8/2012 | Parazzoli et al. | 244/130 |
| 8,276,851 B2 * | 10/2012 | McKeon | 244/204 |
| 8,302,904 B2 * | 11/2012 | McKeon et al. | 244/99.8 |
| 8,460,779 B2 * | 6/2013 | Gupta et al. | 428/156 |
| 2004/0083938 A1 * | 5/2004 | Olsen et al. | 114/67 R |
| 2004/0195462 A1 | 10/2004 | Malmuth et al. | |
| 2005/0003146 A1 * | 1/2005 | Spath | 428/105 |
| 2005/0163963 A1 * | 7/2005 | Munro et al. | 428/90 |
| 2006/0060722 A1 * | 3/2006 | Choi et al. | 244/200.1 |
| 2007/0018055 A1 * | 1/2007 | Schmidt | 244/200 |
| 2007/0194178 A1 * | 8/2007 | Lang | 244/130 |
| 2008/0061192 A1 | 3/2008 | Sullivan | |
| 2009/0001222 A1 | 1/2009 | McKeon | |
| 2009/0065650 A1 | 3/2009 | McKeon et al. | |
| 2010/0159204 A1 * | 6/2010 | Van Merksteijn | 428/169 |
| 2010/0187359 A1 * | 7/2010 | Rawlings et al. | 244/130 |
| 2010/0187360 A1 * | 7/2010 | Rawlings et al. | 244/130 |
| 2010/0187361 A1 * | 7/2010 | Rawlings et al. | 244/130 |
| 2010/0285278 A1 * | 11/2010 | Van Merksteijn | 428/167 |
| 2011/0114794 A1 * | 5/2011 | Boze | 244/200 |
| 2011/0180146 A1 * | 7/2011 | Smith et al. | 137/1 |
| 2011/0262705 A1 * | 10/2011 | Gupta et al. | 428/156 |

FOREIGN PATENT DOCUMENTS

| | | |
|---|---|---|
| AU | 2003-240096 | 12/2003 |
| CA | 2083224 A1 | 5/1993 |
| CA | 2083224 | 10/2000 |
| CA | 2083224 C | 10/2000 |
| CN | 1074279 | 7/1993 |
| CN | 1074279 A | 7/1993 |
| CN | 1044736 | 8/1999 |
| DE | 69224156 D1 | 2/1998 |
| DE | 69224156 T2 | 6/1998 |
| EP | 0543647 | 5/1993 |
| EP | 0543647 A1 | 5/1993 |
| EP | 0543647 B1 | 1/1998 |
| EP | 1525136 | 4/2005 |
| IL | 103804D0 | 4/1993 |
| JP | 2006-200909 | 7/1994 |
| JP | 2001-050215 | 2/2001 |
| JP | 2001050215 | 2/2001 |
| JP | 2005-529298 | 9/2005 |
| KR | 10-19930010393 | 6/1993 |
| KR | 10-20050077732 | 8/2005 |
| MX | 9206696 | 7/1993 |
| RU | 2110702 | 5/1998 |
| WO | 03/106260 | 12/2003 |
| WO | WO 03-106260 | 12/2003 |
| WO | 2008/103663 | 8/2008 |
| WO | WO 2008-103663 | 8/2008 |
| WO | WO-2010/060042 A1 | 5/2010 |

OTHER PUBLICATIONS

Xin et al.; Bio-replicated forming of the biomimetic drag-reducing surfaces in large area based on shark skin; 2008; Chinese Science Bulletin; vol. 53, No. 10; pp. 1587-1592.*

Ball; Shark skin and other solutions; Aug. 5, 1999; Nature; Macmillian Magazines Ltd.; vol. 400; pp. 507-508.*

Anderson, E., McGillis, W., & Grosenbaugh, M. 2001. The boundary layer of swimming fish. J. Exp. Biology 204:81-102.

Bandyopadhyay, P. 1988. Resonant flow in small cavities submerged in a boundary layer. Proc. R. Soc. Lond. A 420:219-245.

Balasubramanian, A., Miller, A., Traub, L., & Rediniotis, O. 2003. Biomimetic nanostructure skin for hydrodynamic drag reduction. AIAA Pap. 2003-785, AIAA, Reno, NV.

Bechert, D. W., Bruse, M., Hage, W. & Meyer, R. 2000. Fluid mechanics of biological surfaces and their technological application. Naturwissenschaften 80:157-171.

Bechert, D. W., Bruse, M., Hage, W., Van der Hoeven, J. & Hoppe, G. 1997. Experiments on drag-reducing surfaces and their optimization with an adjustable geometry. J. Fluid Mech. 338:59-87.

Bechert, D. W., Hage, W., Brusek, M. 1996. Drag reduction with the slip wall. AIAA Journal 34(5):1072-1074.

Bechert, D. W., Bartenwerfer, M. & Hoppe, G. 1986. Drag reduction mechanisms derived from the shark skin. ICAS Congress, 15th, London, 1044-1068.

Bechert, D.W., Hoppe, G. & Reif, W.E. 1985. On the drag reduction of the shark skin. AIAA Shear Flow Control Conference, Mar. 12-14, Boulder, Colorado, AIAA Paper 850546.

Blake, R. 2004. Fish functional design and swimming performance. J. of Fish Biology 65:1193-1222.

Boiko, A., Kozlov, V., Scherbakov, V. & Syzrantsev, V. 1997. Transition control by riblets in a swept wing boundary layer with an embedded streamwise vortex. Eur. J. of Mech. B, Fluids 16(4):465-482.

Brehmer, M. Conrad, L. & Funk. L. 2003. New developments in soft lithography. J. of Disp. Sci & Tech. 24(3/4):291-304.

Breuer, K., Park, J., & Henoch, C. 2004. Actuation and control of a turbulent channel flow using Lorentz forces. Phys. of Fluids 16(4):897-907.

Bruse, M., Bechert, D., van der Hoeven, J., Hage, W. & Hoppe, G. 1993. Experiments with conventional and with novel adjustable drag-reducing surfaces. Proc. of the Int. Cong. on Near-Wall Turbulent Flows, Tempe, AZ, 719-738.

Bushnell, D. 1983. Turbulent drag reduction for external flows, AIAA Paper 83-0227.

Choi, J, Jeon, W. & Choi, H. 2006. Mechanism of drag reduction by dimples on a sphere. Phys. of Fluids 18 (041702):1-4.

Choi, K. 2000. European drag-reduction research—recent developments and current status. Fluid Dyn. Res. 26:325-335.

Choi, K. & Fujisawa, N. 1993. Possibility of drag reduction using d-type roughness. App. Sci. Res. 50:315-324.

Colgate, J. & Lynch, K. 2004. Mechanics and control of swimming: a review. IEEE J. of Ocean Eng. 29(3):660-673.

Corbett, P. & Bottaro, A. 2000. optimal perturbations for boundary layers subject to stream-wise pressure gradient. Phys. of Fluids 12 (1):120-131.

(56) References Cited

OTHER PUBLICATIONS

Davies, C. & Carpenter, P. 1997. Numerical simulation of the evolution of TollmienSchlichting waves over finite compliant panels. J. Fluid Mech. 335:361-392.
Delery, J. 2001. Robert Legendre and Henri Werle: Toward the elucidation of three-dimensional separation. Ann. Rev. Fluid Mech. 33:129-154.
Djenidi, L., Anselmet, F. & Antonia, R. 1999. The turbulent boundary layer over transverse square cavities. J. Fluid Mech. 395:271-294.
Donley, J.M., Sepulveda, C.A., Konstantinidis, P., Gemballa, S., Shadwick, R.E. 2004. Convergent evolution in mechanical design of lamnid sharks and tunas. Nature 429: 61-65.
Fish, F., 1998. Imaginative solutions by marine organisms for drag reduction. Proceedings of the International Symposium on Seawater Drag Reduction, 1-8.
Fish, F. 2006. The myth and reality of Gray's paradox: implication of dolphin drag reduction for technology. Bioinsp. Biomim. 1:17-25.
Fish, F. & Lauder, G. 2006. Passive and active flow control by swimming fishes and mammals. Ann. Rev. Fluid Mech. 38:193-224.
Fransson, J., Talamelli, A., Brandt, L. & Cossu, C. 2006. Delaying transition to turbulence by a passive mechanism. Phys. Rev. Letters 96(6):064501-4h.
Fransson, J., Brandt, L., Talamelli, A. & Cossu, C. 2005. Experimental study of the stabilization of Tollmein-Schlichting waves by finite amplitude streaks. Phys. of Fluids 17(5).
Fransson, J. 2004. Leading edge design process using a commercial flow solver. Exps. in Fluids 37:929-932.
Fulcher, B. & Motta, P. 2006. Suction disc performance of echeneid fishes. Cand. J. Zool. 84:42-50.
Gad-el-Hak, M. 2000. Flow Control Cambridge University Press, New York, NY p. 170.
Grek, G. Kozlov, V. & Titarenko, S. 1995. The influence of ribltes on a boundary layer with embedded streamwise vortices. Phys. Fluids 7(10): 2504-2506.
Hansen, R. & Hoyt, J. 1984. Laminar-to turbulent transition on a body of revolution with an extended favorable pressure gradient forebody. ASME J. Fluids Eng. 106:202-210.
Hebrank, M.R. 1980. Mechanical properties and locomotor functions of eel skin. Biol. Bull. 158: 58-68.
Huber, D.R., Eason, T.G., Hueter, R.E., & Motta, P.J. 2005. Analysis of bite force and mechanical design of the feeding mechanism of the durophagous shark *Heterodontus francisci*. J. Exp. Biol. 208: 3553-3571.
Huber, D.R. & Motta, P.J. 2004. A comparative analysis of methods for determining bite force in the spiny dogfish, *Squalus acanthias*. J. Exp. Zool. 301A:26-37.
Hess, D & Fu, T. 2003. Impact of flow control technologies on naval platforms AIAA paper 2003-3568.
Iuso, G., Onorato, M., Spazzini, P. & Cicca, G. 2002. Wall turbulence manipulation by large-scale streamwise vortices. J. Fluid Mech. 473:23-58.
Jager, W. & Mikelic, A. 2003 Couette flows over a rough boundary and drag reduction. Commun. Math. Phys.232:429-455.
Jimenez, J. 2004. Turbulent flows over rough walls. Ann. Rev. Fluid Mech. 36:173-196.
Joslin, R. (1998) Aircraft laminar flow control. Ann. Rev. Fluid Mech. 30:1-29.
Jung, W. J., Mangiavacchi, N., Akhavan, R. 1992. Suppression of turbulence in wall-bounded flows by high frequency spanwise oscillations. Phys. Fluids A 4:1605-7.
Karniadakis, G.E. & Choi, K. 2003. Mechanisms on transverse motions in turbulent wall flows. Ann. Rev. Fluid Mech. 35:45-62.
Kim, C., Jeon. W. & Choi, H. 2005. Skin-friction reduction by multiple cavities. 2005 APS DFD Meeting.
Lang, A., Hidalgo, P. & Westcott, M. 2006. Flow over a Biomimetic Surface Roughness Geometry. Bulletin of the 2006 APS Division of Fluid Dynamics Meeting, Tampa, FL.
Lang, M., Rist, U. & Wagner, S. 2004. Investigations on controlled development in a laminar separation bubble by means of LDA and PIV. Exp. In Fluids 36:43-52.

Lashkov, Y. & Samoilova, N. 2002. On the viscous drag of a plate with spherical recesses. Fluid Dyn. 37 (2):231-236.
Lee, S.-J. & Lee, S.-H. 2001. Flow field analysis of a turbulent boundary layer over a riblet surface. Exps. in Fluids 30:152-166.
Leonardi, S., Orlandi, P, Smalley, R., Djenidi, L. & Antonia, A. 2003. Channel flow with transverse square bars on one wall. J. Fluid Mech. 491:229-238.
Lin, J. 1999. Control of turbulent boundary-layer separation using micro-vortex generators. AIAA paper 99/3404.
Lin, J. 2002. Review of research on low-profile vortex generators to control boundary-layer separation. Frog. in Aero. Sci. 38:389-420.
Lingham-Soliar, T. 2005. Dorsal fin in the white shark, *Carcharodon carcharias*: a dynamic stabilizer for fast swimming. J. of Morph. 263:1-11.
Liu, Z-C. & Adrian, R. J. 1999. Evidence for hairpin packet structure in DNS channel flow. Proc. First International Symposium on Turbulent Shear Flow Phenomena, pp. 609-614.
Min, T. & Kim, J. 2004. Effects of hydrophobic surface on skin-friction drag. Phys. Fluids 16(7):55-4.
Min, T. & Kim, J. 2005. Effects of hydrophobic surface on stability and transition. Phys. Fluids 17(10):108106-4.
Motta. P. 1977. Anatomy and functional morphology of dermal collagen fibers in sharks. Copeia 3:454-464.
Pavlov, V. 2006. Dolphin skin as a natural anisotropic compliant wall. Bioinsp. Biomim. 1:31-40.
Ramanan, N. & Homsy, G. 1994. Linear stability of lid-driven cavity flow. Phys. Fluids 6 (8):2690-2701.
Raschi, W. & Tabit, C. 1992. Functional aspects of placoid scales: A review and update. Aust. J. Mar. Freshwater Res. 43: 123-147.
Reif, W.E. 1985. Morphology and hydrodynamic effects of the scales of fast swimming sharks. Fortschritte der Zoologie 30: 483-485.
Robey, H. 1987. On the use of a phased heater array for the controlled excitation of arbitrary three-dimensional perturbations in a laminar boundary layer. Exps. in Fluids 5(1):33-35.
Robey, H. 1986. The nature of oblique instability waves in boundary layer transition. Ph.D. thesis at the California Inst. of Tech.
Rohr, J., Latz, M., Fallon, S., Nauen, J. & Hendricks, E. 1998. Experimental approaches towards interpreting dolphin-stimulated bioluminescence. J. Exp. Bio. 201:14471460.
Saric, W., Carpenter, A., Kluzek, C., Hunt, L., McKnight, C. 7 Schouten, S. (2005) Flight experiments on laminar flow control in swept-wing boundary layers 2005 APS DFD Meeting.
Saric, W., Reed, H. & White, E. 2003. Stability and transition of three-dimensional boundary layers. Ann. Rev. Fluid Mech. 35:413-440.
Sass, G. & Motta, P. 2002. The effects of satiation on prey capture kinematics in the largemouth bass, *Micropterus salmoides*. Env. Biol. Fish. 65: 441-454.
Savill, A. 1988. A flow visualization investigation of turbulent boundary layer structure over micro air bearing surfaces including effect of outer layer manipulation. 2nd Int/ Symp. on Fluid Control, Measurement Mech. and Flow Vis. p. 430-436.
Schneider, P. 1989. Effects of controlled three-dimensional perturbations on boundary layer transition. Ph.D. thesis at the California Inst. of Tech.
Schumacher, J., Carman, M., Estes, T., Feinberg, A., Wilson, L., Callow, M., Callow, J. Finlay, J. & Brennan, A. 2007. Engineering antifouling microtopographies—effect of feature size, geometry, and roughness on settlement of zoospores of the green alga Ulva. Biofouling 23 (1/2):55-62.
Sfakiotakis, M., Lane, D. & Davies, J. 1999. Review of fish swimming modes for aquatic locomotion. IEEE J. of Ocean Eng. 24(2):237-252.
Segawa, T., Li, F., Yoshida, H., Murakami, K. & Mizunama, H. 2005. Spanwise oscillating excitation for turbulence drag reduction using alternative suction and blowing. AIAA Pap. 2005-488, AIAA, Reno, NV.
Sirovich, L & Karlsson, S. 1997. Turbulent drag reduction by passive mechanisms. Nature 388:753-755.
Su, B., Zhang, D. & Button, T. 2002. Micropatterning of fine scale ceramic structures. J. of Mat. Sci. 37:3123-3126.

(56) References Cited

OTHER PUBLICATIONS

Tuncer, I. & Platzer, M. 1999. A computational study of flow separation characteristics and wake profiles behind a flappling airfoil. AIAA paper 99/0648.
Videler, J. 1995. Body surface adaptions to boundary-layer dynamics. Symp. of the Soc. for Exp. Bio. 49:1-20.
Wainwright, S. 1978. Shark skin: a function in locomotion. Science 202:747-749.
Walker, J. 2003. Unsteady separation processes at high Reynolds Number and their control. Flow, Turb. & Comb. 71:61-74.
Wang, Z, Yeo, K. & Khoo, B. 2003. Numerical simulation of laminar channel flow over dimpled surfaces. AIAA 2003-3964.
Wasserman, P. 7 Kloker, M. 2002. Mechanisms and passive control of crossflowvortex-induced transition in a three-dimensional boundary layer. J. Fluid Mech. 4456:49-84.
Wetzel, K. & Farokhi, S. 1996. Interaction of vortex generators and riblets on an airfoil. AIAA paper 1996-2428.
Wintzer, A. & Motta, P. 2004. The effects of temperature on prey capture kinematics of the bluegill sunfish, *Lepomis macrochirus*: implications for feeding studies. Cand. J. Zool. 82:794-799.
Yao, H., Cooper, R. & Raghunathan, S. 2004. Numerical simulation of incompressible laminar flow over three-dimensional rectangular cavities. J. Fluids Eng. 126:919-927.
International Search Report and Written Opinion issued Apr. 6, 2010 for International Application No. PCT/US2009/065539, filed Nov. 23, 2009 (First inventor—Lang; Applicant—The University of Alabama).
International Preliminary Report on Patentability issued on May 24, 2011 for International Application No. PCT/US2009/065539, filed on Nov. 23, 2009 (First inventor—Lang; Applicant—The University of Alabama).
International Search Report and Written Opinion issued on Jul. 2, 2008 for International Application No. PCT/US2008/004249, filed on Mar. 31, 2008 (First inventor—Lang; Applicant—The University of Alabama).
International Preliminary Report on Patentability issued on Oct. 6, 2009 for International Application No. PCT/US2008/004249, filed on Mar. 31, 2008 (First inventor—Lang; Applicant—The University of Alabama).
International Search Report and Written Opinion issued on Jul. 15, 2008 for International Application No. PCT/US2008/054288, filed on Feb. 19, 2008 (First inventor—Lang; Applicant—The University of Alabama).
International Preliminary Report on Patentability issued on Aug. 26, 2009 for International Application No. PCT/US2008/054288, filed on Feb. 19, 2008 (First inventor—Lang; Applicant—The University of Alabama).
Non-Final Rejection issued on Mar. 2, 2011 for U.S. Appl. No. 11/708,897, filed Feb. 21, 2007 (First Inventor—Lang).
Amendment Submitted with CPA/RCE filed on Oct. 21, 2010 for U.S. Appl. No. 11/708,897, filed Feb. 21, 2007 (First Inventor—Lang).
Final Rejection issued on Jun. 21, 2010 for U.S. Appl. No. 11/708,897, filed Feb. 21, 2007 (First Inventor—Lang).
Response after Non-Final Rejection filed on Mar. 18, 2010 for U.S. Appl. No. 11/708,897, filed Feb. 21, 2007 (First Inventor—Lang).
Non-Final Rejection issued on Dec. 18, 2009 for U.S. Appl. No. 11/708,897, filed Feb. 21, 2007 (First Inventor—Lang).
Response after Non-Final Rejection filed on Sep. 2, 2011 for U.S. Appl. No. 11/708,897, filed Feb. 21, 2007 (First Inventor—Lang).
Bechert, D.W., et al., "On the Drag Reduction of the Shark Skin," AIAA Shear Flow Control Conference, Boulder, Colorado, Mar. 12-14, 1985, 19 pages.
Bruse, M., et al., "Experiments with conventional and with novel adjustable drag—reducing surfaces," Near-Wall Turbulent Flows, 1993, pp. 719-738.
Bushnell, D., et al., "Drag Reduction in Nature," Annual Review of Fluid Mechanics, vol. 23, 1991, pp. 65-79.
Choi, H., et al., "Direct numerical simulation of turbulent flow over riblets," Journal of Fluid Mechanics, vol. 255, 1993, pp. 503-539.
Gatski, T., et al., "Embedded Cavity Drag in Steady Laminar Flow," AIAA Journal, vol. 23, No. 7, 1985, pp. 1028-1037.
Narasimha, R., et al., "Relaminarization in highly accelerated turbulent boundary layers," Journal of Fluid Mechanics, vol. 61, Issue 3, Nov. 1973, pp. 417-447.
Official U.S. Office Action, dated Jul. 1, 2013, in related U.S. Appl. No. 13/130,448.
International Search Report and Written Opinion, dated May 20, 2013, received in connection with related International Application No. PCT/US2013/029908.
International Search Report and Written Opinion for International Application No. PCT/US2009/065539 (mailed Apr. 6, 2010).
Chernyshov, O., et al., "Some Peculiarities of the Structure of the Skin of Sharks," Bionika, vol. 4, 1970, pp. 77-83.
Doligalski, T., et al., "Vortex Interactions with Walls," Annual Review of Fluid Mechanics, vol. 26, 1994, pp. 573-616.
Reif, W.E., "Evolution of high swimming velocities in sharks—a case of escalation?," Neues Jahrbuch für Geologie und Paläontologie Monatshefte, vol. 6, 1988, pp. 361-379.
Reif, W., et al., Hydrodynamics of the squamation in fast-swimming sharks, Neues Jahrbuch für Geologie und Paläontologie Monatshefte, vol. 164, 1982, pp. 184-187.

\* cited by examiner

MICRO-ARRAY SURFACE FOR PASSIVE DRAG MODIFICATION

FIELD OF THE INVENTION

An improved apparatus for reducing or enhancing the skin friction drag of an aerodynamic or hydrodynamic surface, and in particular to an improved micro-array surface design for reducing or enhancing the skin friction drag coefficient and/or heat transfer rate of aerodynamic or hydrodynamic surfaces.

BACKGROUND

The promise of drag reduction over solid surfaces in high Reynolds number flows is one that has captured the attention of researchers for years, yet has remained illusive. In the past, numerous approaches have used both passive and active methods to control the flow in a turbulent boundary layer. In one exemplary approach, it is relatively well known that the aerodynamic drag of a surface may be reduced by applying a microscopic "texture" to the otherwise smooth surface. Although the exact fluid dynamic mechanism at work in this drag reduction is not well understood, it is speculated that the reduction relates to controlling the turbulent vortices in the boundary layer adjacent to the surface. The microscopic texture reduces the skin friction drag of solids moving through fluids (e.g., aircraft, ships, cars, etc.), and of fluids moving along solids (e.g., pipe flow, etc.).

One well known geometric form for a microscopic, friction-reducing texture is known as "riblets." Conventionally, riblets are positioned on a surface to form an integrated series of groove-like peaks and valleys with V-shaped cross-sections. Normally, the riblets are positioned to extend along the aerodynamic surface of the object in the direction of fluid flow. In one example, the height of the riblets and the spacing between the riblets are usually uniform and on the order of 0.001 to 0.01 inches for most applications.

Dimensionless units, sometimes referred to as wall units, are conventionally utilized in describing fluid flows of this type. The wall unit h+ is the non-dimensional distance away from the wetted surface or more precisely in the direction normal to the surface, extending into the fluid. Thus h+ is a non-dimensional measurement of the height of the riblets. The wall unit s+ is the non-dimensional distance tangent to the local surface and perpendicular to the flow direction, thus the non-dimensional distance between the riblets. In the prior art riblets, h+ and s+ are in the range between 10 and 20. Exemplary riblet designs can comprise an adhesive film applied to a smooth solid surface or alternatively, with advanced manufacturing techniques, the same shapes may be directly formed and integrated into the structure of the aerodynamic surface.

The interaction of riblets with the structure of the turbulent boundary layer of the fluid reduces the skin friction drag coefficient (Cdf) of the surface by approximately 6% compared to an identical smooth surface without riblets. This reduction occurs despite the significant increase in "wetted area" (the surface area exposed to the fluid stream) of a riblet-covered surface over a smooth surface. In attempts to further reduce the Cdf, modifications to conventional V-shaped riblets have been proposed. Examples include rounding of the peaks and/or valleys of the respective riblets, as well as even smaller V-shaped notches in the sides of the larger V-shaped riblets.

Further examples of improved riblet designs that decreases skin friction drag with less concomitant increase in wetted area than conventional riblets include the use of a series of parallel riblets that extend longitudinally from a smooth surface. In this example, the riblets have a triangular cross-section in the transverse direction in which the apex of the cross-section defines a continuous, undulated ridge with peaks and valleys that causes an effective reduction in Cdf. The wetted area of this exemplary design is increased less than with conventional riblets.

SUMMARY

Embodiments of this invention provide a surface of an object that is configured to provide for either drag reduction or enhancement, with the latter being beneficial in applications where increased turbulent mixing is desired such as in heat transfer applications. In one aspect, an aerodynamic or hydrodynamic wall surface that is configured to modify a fluid boundary layer on the surface comprises at least one array of roughness elements disposed on and extending therefrom the surface. In one example, the interaction of the roughness elements with a boundary layer of fluid can act to delay transition to reduce the skin friction drag coefficient of the surface over an identical smooth surface without the roughness elements.

In a second embodiment, a method for a reduction in skin friction drag comprises an array of three-dimensional micro-cavities. In one aspect, an array of stable, embedded cavity vortices within a micro-roughness surface geometry is formed that produces a three-dimensionally patterned partial slip condition over the surface. This complex boundary condition passively forces the boundary layer flow and results in sub-laminar skin friction. In another aspect, the formed boundary condition can act to delay transition to turbulence within the boundary layer. Features of the transition process from a laminar to a turbulent boundary layer can occur in small scale flow structures close to the wall. These structures can be altered by the presence of the partial-slip boundary condition due the presence of the micro-cavities.

Other systems, methods, features, and advantages of the drag modification system of the present invention will be or become apparent to one with skill in the art upon examination of the following figures and detailed description. It is intended that all such additional systems, methods, features, and advantages be included within this description, be within the scope of the passive micro-array system, and be protected by the accompanying claims.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

FIG. 22A shows the laminar boundary conditions; FIG. 22B shows the top view of the laminar boundary layer; and FIG. 22C shows a side view of the turbulent boundary layer.

DETAILED DESCRIPTION OF THE INVENTION

Figure 1:
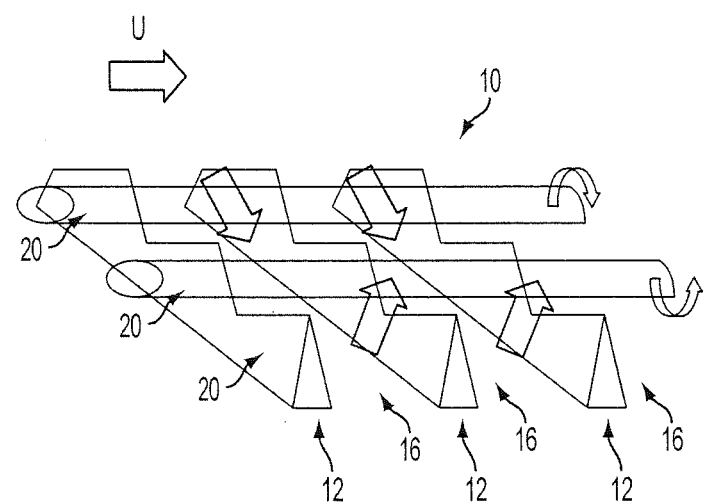
FIG. 1 shows a schematic flow model for a drag enhancing d-type surface roughness, in which downwash is shown between the counter-rotating vertex pair and upwash, that would occur on either side, is shown on the front region of the surface roughness.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" include plural referents unless the context clearly dictates otherwise. Thus, for example, reference to "a roughness element" includes arrays of two or more such roughness elements, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

The present invention may be understood more readily by reference to the following detailed description of embodiments of the invention and the Examples included therein and to the Figures and their previous and following description.

Referring to FIG. 1, an array of roughness elements 10 with the induced flow field is illustrated. As shown, spanwise or transverse cavities 16 are defined between the ridges 12 that are exemplarily formed from adjoined roughness elements 20 that are positioned substantially transverse to the flow of the fluid over the surface 2, which results in a series of cavity flows, each containing a re-circulating flow field. In the exemplary embodiment illustrated in FIGS. 1 and 2, roughness elements 20 are integrally connected together to form individual ridges 12 that are positioned on and extend from the surface 2 substantially transverse to the flow of fluid across the surface 2. In one aspect, the ridges 12 are spaced substantially uniform and, optionally can be variably spaced.

In one aspect, due to the spacing of the saw tooth peaked roughness elements 20, an on average streamwise vortex forms in the flow above each cavity, such as found in the case of drag enhancing riblets. In one aspect, it is contemplated that the cavities would comprise vortices of alternating sign as this would appear to provide the most stable flow regime. In this aspect, and as illustrated, neighboring vortices contribute to upwashes and downwashes in an alternating manner across the spanwise direction.

One skilled in the art will also appreciate that alternative shapes of the roughness elements 20 are contemplated. Exemplary alternative shapes can comprise, but are not meant to be limited to, a blade-like thin peak, which allows the formation of an increased number of vortices in a predetermined spanwise dimension, a trapezoidal cross-sectional shape with a flat portion of the ridge over which the vortices will form, and the like.

Independent of the ideal shape of the ridges 12, the overall characteristics of the flow field remains unchanged. In operation, and referring to FIG. 1, a fluid particle would enter from the left at some distance above the surface 2, such as exemplary shown as a flat plate. As the fluid particle approaches the surface it feels the presence more of the counter-rotating vortex pair and is pulled downward into a region of downwash. As it enters this downwash, the fluid particle enters the cavity 16 and is spun around, in an almost slingshot type motion, and injected back out above the surface through an upwash region of the channels. From a heat transfer standpoint, the proposed surface causes fluid particles far away from the surface to come in contact (or very near) to the surface for a short period of time and then to be pushed out again far above the surface. With this "on average" flow field, the burst/sweep process has been accentuated and controlled to take place in an organized manner. Thus, in one aspect, the exemplary array of roughness elements 10 provides an efficient manner by which a turbulent boundary layer flow can be optimized for convective heating/cooling purposes over a solid surface.

In one exemplary aspect, in order to cause as much fluid as possible to come in contact with the "rough" surface 2, the spacing between the transverse cavities 16 should be minimized. However, if the spacing became too small, the mass flow rate pumped through the cavities would decrease due to viscous effects. In one exemplary aspect, the average height of the ridges ($h^+$) is substantially equal to the width of the cavity ($w^+$), or is about a one to one height to width ratio ($h^+ \approx w^+$). In another aspect, with respect to the average height of the cavities, it can be greater than about half the peak-to-peak amplitude of the saw tooth pattern along the ridges. In an exemplary aspect, the amplitude for riblet spacing would be about and between 10 $s^+$ to 20 $s^+$. In another example, the amplitude would be about 15 $s^+$. In this aspect, this would also be the average height of the ridges, with the minimum valley point of the ridges located at an elevation of $s^+$ that is about 7.5 (±2.5) above the bottom of the cavity, and maximum peak located at $s^+$ that is about 22.5 (±2.5).

In a further aspect, the wavelength of the saw tooth pattern can be about $\lambda^+=40$, based on the size of a typical vortex mentioned previously of $s^+$ being about 30. This would be sufficient to hold a vortex between the peaks. Of course, it will be appreciated that these dimensions are exemplary only and are not meant to be limiting. Further, one will appreciate that the exemplary dimensions can be scaled as desired.

Figure 2:
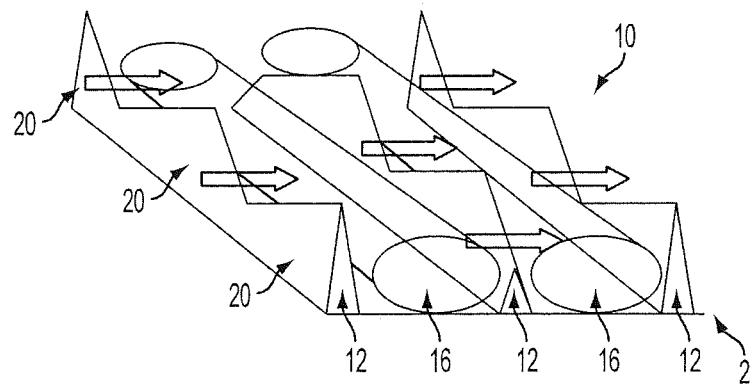
FIG. 2 shows a schematic flow model for a drag reducing d-type surface roughness, in which outflow, as depicted by the arrows, from the upstream cavity to the adjacent neighboring downstream cavity occurs through the valleys in the saw tooth geometry of the formed ridges.

Referring now to FIG. 2, an exemplary flow field through the drag reducing roughness element 20 is illustrated. It has been demonstrated that a series of transverse cavities 16 with substantially constant ridge height is prone to a random efflux/influx of fluid due to the high shear region located above the cavities. This high shear region results in the formation of streamwise vortices and low speed streaks above the cavities such as found in the smooth surface case. It is likely that the peak velocity may be larger for cavities 16 formed by a series of transverse blades, but would more than likely still be a large enough percentage below the freestream that streamwise vortices would still be formed due to a high shear region above the cavities. As shown in FIG. 2, to prevent and/or reduce the efflux/influx process out/into the cavities, a saw tooth geometry is defined by the respective roughness elements 20 that form the ridges of the array of roughness elements.

In this example, the substantially transverse cavities formed between the adjacent ridges help with the stability of the flow field as the flow through the cavities is given a longer distance (two cavity widths as opposed to one) by which it is exposed and pulled along by the flow directly above. As a result of the exemplary geometry, the estimated peak velocity achieved is in a range between about 5 to 40 percent of the freestream flow. Second, the jets formed through the cavities are substantially tangent to the flow above so that very little vertical velocity component is formed. If one were looking down onto the surface, the formed jets would appear to be a periodic array of suction and blowing at a smooth wall. Finally, the flow acting on the bottom of the cavities results in a shear stress that provides thrust to the surface. In this case the effect is such that it may act to cancel out a large percentage of the skin friction losses due to the momentum change in the flow over the vertical walls of the cavities. It is contemplated that this effect is more pronounced as higher peak velocities in the jets (and thus closer to the bottom surface of the cavities) are achieved. Thus, in one example, the width of the cavities 16 can be increased or maximized (such that the stable flow field in FIG. 2 is maintained) so as to decrease the number of spanwise channels over a given surface area.

In this aspect, considering an averaged streamline through the roughness element, a fluid particle that starts from the left close to the surface would approach a transverse cavity in the array and upon entering the cavity be captured by the cavity vortex and travel around in a spiral motion before being passed through another cavity just to enter the neighboring cavity and repeat the previous motion. In this example, all fluid near the ridge stays near the ridge and there is little or no on average vertical velocity component away from the cavities of the array. Given the flow model as stated, and that the cavities are dimensionally small enough such that viscous effects dominate, it is contemplated that the net skin friction drag over such an exemplary surface could start to approach that of a laminar flat plate boundary layer.

In one aspect, the formed "rough" surface can be categorized as a series of trapezoidal channels (d-type roughness geometry) that are orientated in the spanwise direction (transverse to the flow of fluid across the array), but, in one exemplary aspect, with a saw tooth geometry of alternating peaks along the ridges of the channels giving the surface a three-dimensional, yet repeatable, pattern. The alignment of the peaks in the streamwise direction of the flow of fluid is proposed to increase drag, while the alternation of the peaks in the streamwise direction will decrease drag. In one aspect, the spacing between the ridges in the streamwise direction can vary from ½ to a full value of the peak height (or amplitude) of the ridges with respect to the bottom of the cavities. In another aspect, the distance between adjacent successive ridges can be in a range of between about 40 to 60% of the peak longitudinal height or amplitude of the roughness elements that form the respective ridges. Optionally, the distance between adjacent successive ridges can be in a range of between about 45 to 55% of the peak longitudinal height or amplitude of the roughness elements that form the respective ridges In an alternative embodiment of the invention, and referring now to FIGS. 3-12, the micro-array 10 can comprise a plurality of roughness elements 20 that can extend from the surface and be positioned in spaced ridges 16 along the surface 2. In this aspect, it is contemplated that each roughness element 20 has a front, upstream surface 22 and an opposing rear, downstream surface 24. Further, each roughness element has a peripheral edge 26 that has an upper portion 28 that tapers to a top 29 and a bottom portion 30 that tapers to a base 31. As one would appreciate, the base is configured to be connected to the underlying surface 2 of the object. In one exemplified aspect, the roughness elements 20 are positioned on the underlying surface 2 substantially transverse to the flow of the fluid across the surface. In another aspect, the roughness elements extend substantially normal to the underlying surface. For example, and not meant to be limiting, the transverse longitudinal height of the roughness elements can be between about 0.001 to 2.00 cm.

In one aspect, a plurality of roughness elements 20 can be positioned transverse to the flow of fluid across the surface such that a distance between a medial portion 32 of the peripheral edges of adjacent and aligned roughness elements 20 is less than the distance between the respective tops 29 of the roughness elements and is less than the distance between the respective bases 31 of the roughness elements. In a further aspect, adjacent and aligned roughness elements can be connected at some selected portion of the respective peripheral edges of the roughness elements. In this aspect, a channel 34 is defined therebetween portions of the bases and the bottom portions of the peripheral edges of the adjacent and adjoined roughness elements. In one exemplary aspect, it is contemplated that the formed channels would extend longitudinally substantially co-axial to the flow of the fluid across the surface. In an alternative aspect, the adjoining roughness elements can be connected together such that no channel is formed therebetween the respective adjoining elements. In a further aspect, the adjoined roughness elements can form a "saw tooth" ridge that extends substantially transverse to the fluid flow.

Figure 3:
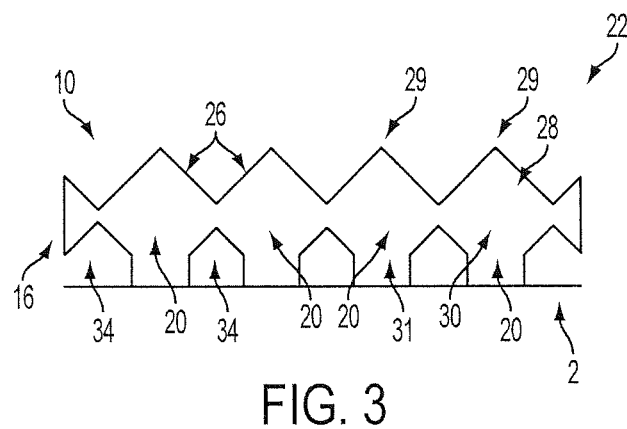
FIG. 3 shows a schematic front elevational view of one embodiment of a ridge of an array of roughness elements of the present invention. In one aspect, for drag reduction, the elements can be aligned such that the peaks of the roughness elements of each adjacent ridge can be staggered and can be spaced at about half the peak height of the roughness element. In this view, flow will encounter the ridge by moving into the figure. In one exemplary aspect, the spacing between the peaks of the adjoined roughness elements is on the order of about 30 viscous length scales at close to maximum velocity for the fluid passing over the wall surface.
Figure 4:
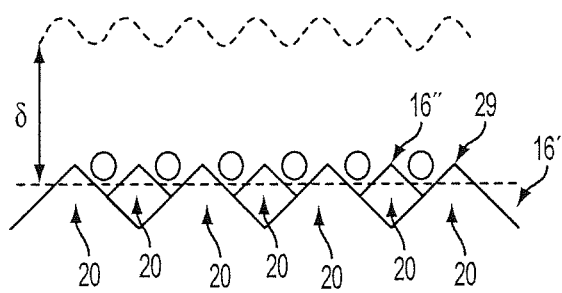
FIG. 4 is a side elevational schematic view of the exemplary micro-array of roughness elements shown in FIG. 3, showing the tops of the roughness elements of FIG. 3 and showing the formation of counter-rotating streamwise vortices due to the staggered alignment of adjacent rows of the roughness elements in the drag enhancing case. The flow of fluid is directed into the figure.
Figure 5:
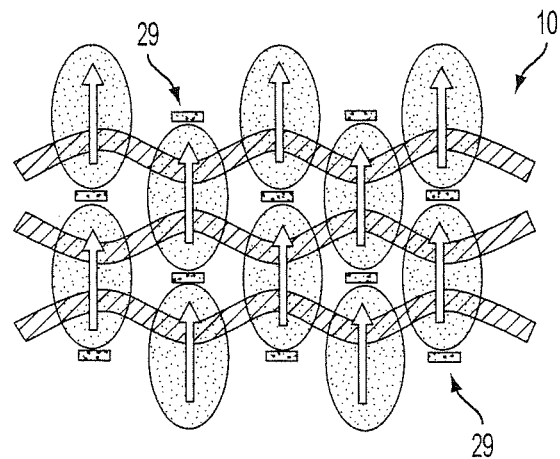
FIG. 5 is a top elevational schematic view of exemplary vertex structures that form within the transversely extending cavities of an exemplary micro-array of roughness elements of FIG. 3 of the present invention, showing fluid flow moving from the bottom to the top of the figure and showing dark short lines correspond to the peaks of the roughness element in FIG. 3.
Figure 6:
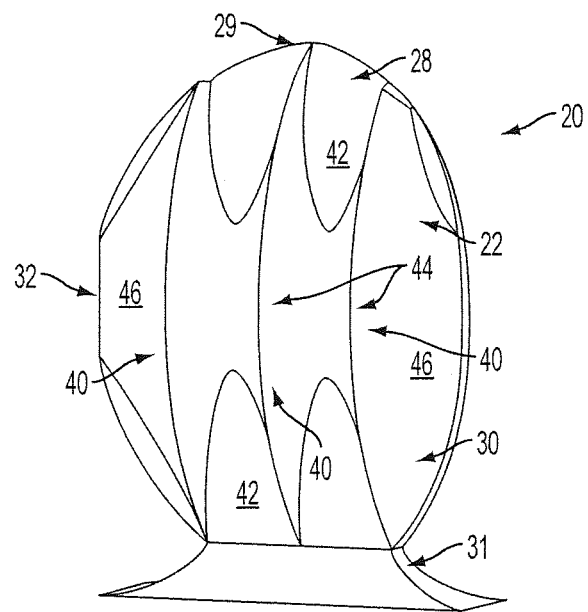
FIG. 6 is a perspective view of one embodiment of a roughness element of a micro-array of the present invention, showing riblets formed on a front, upstream surface of the roughness element.
Figure 7:
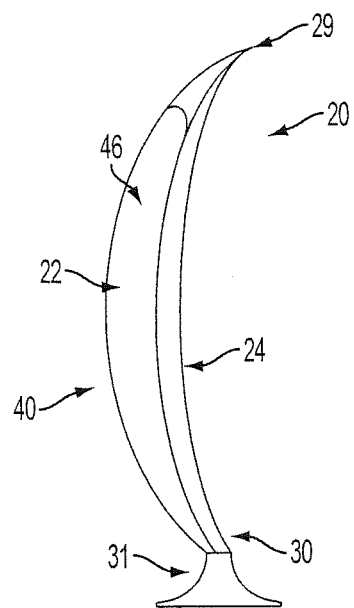
FIG. 7 is a side elevational view of the roughness element of FIG. 6.
Figure 8:
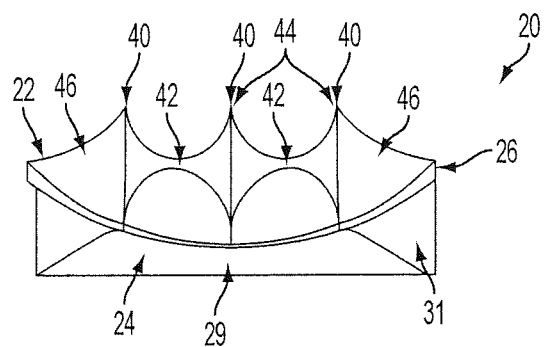
FIG. 8 is a top elevational view of the roughness element of FIG. 6.
Figure 9:
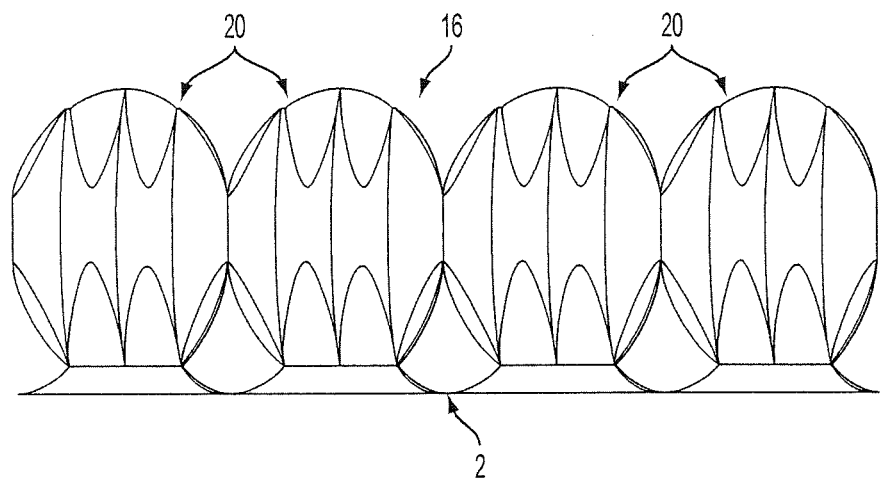
FIG. 9 is front, upstream elevational view of a plurality of adjoined roughness elements of FIG. 6 that form a ridge, and showing a plurality of channels formed between portions of the respective bases and the bottom portions of the peripheral edges of the respective adjoined roughness elements.
Figure 10:
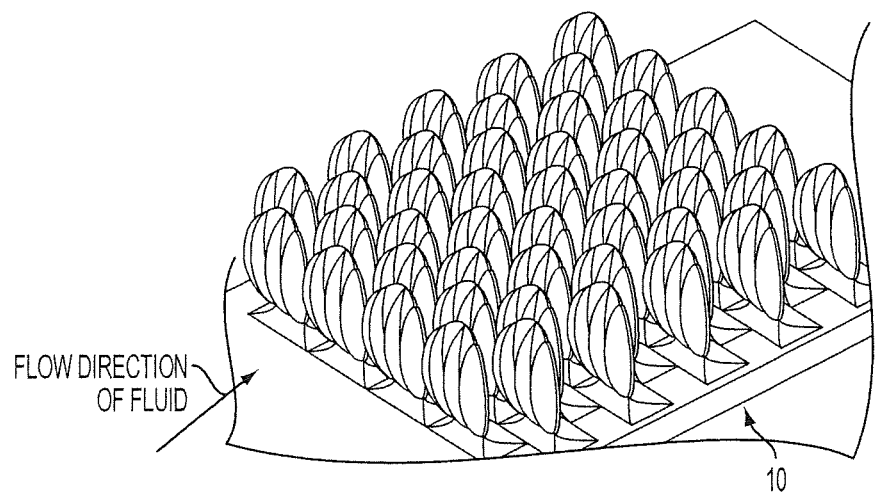
FIG. 10 is a perspective view of a portion of a micro-array of the present invention, showing a plurality of staggered rows of the formed ridges of adjoined roughness element of FIG. 8, and showing the approximate spacing between the rows of ridges to be approximately half the height of a roughness element.

In one embodiment, the roughness element 20 has a substantially diamond cross-sectional shape, as shown in FIG. 3. Alternatively, and as shown in FIG. 6, the roughness element 20 can have a substantially oval shape. Of course, one skilled in the art will appreciate that other geometric shapes are contemplated and that the aspects illustrated are merely exemplary.

Referring now to FIGS. 6-10, in one aspect, it is contemplated that the front, upstream surface 22 of the roughness element 20 has a curved, convex cross-sectional shape relative to the flow of fluid across the surface 2 of the object. In another aspect, it is contemplated that the rear, downstream surface 24 of the roughness element has a curved, concave cross-sectional shape relative to the flow of fluid toward the rear surface 24 to promote the recirculation of the flow within the cavity, and to act as a streamlining effect in both stabilizing and promoting the embedded vortex flow field. In one aspect, this slight concavity in the rear surface 24 of the roughness element also acts to position the tops 29 of the roughness elements at a slight, acute angle relative to the underlying surface such that the tops of the roughness elements do not protrude into the fluid flow normal to the flow direction. In one aspect, it is contemplated that the radius of curvature of the rear surface 24 of the roughness element is less than the radius of curvature of the front surface 22 of the roughness element.

In a further aspect of the present invention, each roughness element 20 can have at least one riblet 40 extending outwardly therefrom the front surface 22 of the roughness element. In one aspect, the riblet 40 extends longitudinally from at or near the bottom portion 30 of the roughness element, proximate the base 31, to at or near the top 29 of the roughness element. That is, in one aspect, the riblet extends substantially transverse to the underlying surface. If a plurality of riblets are used, it is contemplated that the ribs can be spaced apart substantially equal or at varying distances. Of course, the number of riblets 40 may vary in number, but typical values would be that from 1 to 7 per each longer wavelength of the saw tooth pattern of the formed ridge of the micro-array. In one aspect, the number of riblets is 1, 3, 5, or 7.

The presence of the riblets 40 formed to either the front surface 22, or, optionally, to both sides of the roughness element, act to give a streamlining effect that is conductive to the formation and stability of the cavity flows (or vortices) embedded within the cavities formed between adjacent ridges or rows of the roughness elements. In one aspect, the addition of the riblets to the roughness elements micro-geometry help to increase drag reduction, such as, for example, with higher speed flows. In a further aspect, the riblets 40 act to excite counter-rotating vortices within the outer vortex structure that when in even numbers (formed by an odd number of riblets) promote the stability of the vortex array in the surface.

Further, in another aspect, it is contemplated that a trough 42 is defined therebetween adjacent riblets 40 that is recessed from the respective tips 44 of the riblets. In one aspect, the trough may be formed by a smooth, curved surface. Of course, it is contemplated that the surface of each of the troughs in the respective roughness element can have a substantially equal radius of curvature or can vary as desired.

In another aspect, the riblets 40 have an edge surface 46 that extends between the respective riblets that are adjacent to the sides of the roughness element. In one aspect, the edge surface 46 can be substantially planar. Alternatively, at least a portion of the edge surface can be curved. In the curved aspect, it is contemplated that the radius of curvature of the edge surface can be greater than the radius of curvature of the troughs 42 of the roughness elements.

It is further contemplated that the geometry of the formed surface of the present invention can be altered as a function of the thickness of the boundary layer adjacent to the surface. For example, in regions where the boundary layer is thicker, the tops 29 of the roughness elements 20 may also comprise an additional saw tooth pattern of shorter wavelength superimposed on the larger wavelength saw tooth pattern. This is of importance in regions far downstream from the leading edge of a body where the boundary layer is thicker, yet the flow outside the boundary layer and above the surface is of high velocity.

In a drag reduction mode, the saw tooth pattern on the tops 29 of the roughness elements 20 acts to inhibit the formation of the optimal perturbations that appear due to the instability of the shear flow (or boundary layer) above the roughness element and inside the boundary layer. At lower speeds this wavelength is larger. Conversely, at higher speeds this wavelength is smaller. In one exemplary aspect, the smaller wavelength superimposed on the larger saw tooth tops can vary from between about ⅓ to ⅐ that of the larger wavelength. The sizing is a function of the speed of the flow outside the boundary layer adjacent to the surface (U), the kinematic viscosity of the fluid (v) and the maximum shear in the boundary layer ($(du/dy)_{max}$). It should be noted that as a body moves at higher speeds, the boundary layer at a particular point on the body will reduce in thickness and the maximum shear sustained in the boundary layer will increase. This corresponds to a decrease in the wavelength sizing required of the roughness element to act in drag reduction mode.

Regardless of whether a surface results in the formation of embedded vortices within the respective roughness elements or not, the "male protrusions" that result from the roughness elements and their sizing may be sufficient enough to delay the transition to turbulence in the boundary layer and thus still result in drag reduction. However, to maximize the drag reduction characteristic of the micro-array of roughness elements of the present invention would include both the formation of the embedded spanwise vortex array within the roughness element as well as the protrusion geometry of the roughness geometry, which leads to the damping of instabilities in the boundary layer that result in the transition to turbulence.

In addition, and as noted above, the downstream side of the roughness elements can, or can not, comprise a slight concavity to the surface (see FIG. 7) as well. This thickness to the peak of the formed ridge provides a smooth line of reattachment for the separated shear layer over the top of the cavity from the previous upstream roughness element and at the top of the roughness element provides for a tangential meeting of this outer flow with the next downstream embedded cavity vortex (again, see FIG. 7). All of the elements listed here have to do with the effects of streamlining the micro-geometry to promote the formation of a stable, embedded cavity vortex within the roughness element.

Further, it is contemplated that the micro-array of roughness elements 10 on the surface 2 can comprise a plurality of micro-arrays of roughness elements 10 on the respective surface 2. In this aspect, each micro-array can comprise a plurality of roughness elements, as described above, of a predetermined height and/or shape. Thus, it is contemplated that, the plurality of micro-arrays could comprise arrays of varying sized or shaped roughness elements.

In another aspect, each micro-array of roughness elements can comprise individual roughness elements that vary in respective scale and/or shape. For example and not meant to be limiting, adjacent roughness elements could have different relative scaled dimensions. Thus, a "large" roughness element can adjoin a "small" roughness element, such that a front view would be of a line or ridge of the adjoining roughness elements that have a staggered saw tooth appearance.

Figure 11:
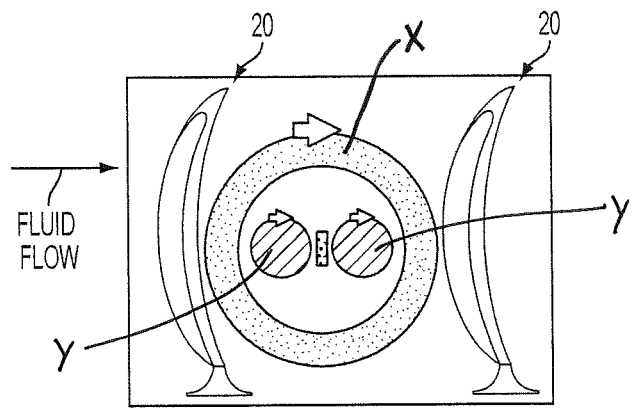
FIG. 11 is a schematic diagram of cavity flow of representative fluid flow between the tops of roughness elements of FIG. 6 and across one "valley," the roughness elements being positioned in adjacent ridges or rows. In this diagram, fluid flow over the surface is from left to right.
Figure 12:
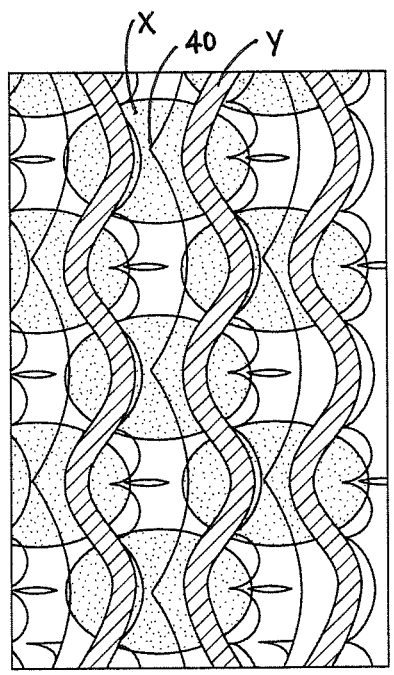
FIG. 12 is a top elevational schematic view of exemplary vertex structures that form on an exemplary micro-array of roughness elements of FIG. 6 of the present invention, showing fluid flow moving from the left to the right of the figure. The shaded vortices represent the outer vortices X shown in FIG. 11 and may have small counter-rotating vortices Y superimposed on the outer-vortices X that make the flow field consistent to its neighboring vortices. In the exemplified aspect with three riblets on the front face of the roughness element, two counter-rotating vortices would form with an upwelling between them and a downwash to the flow at the sides. These vortices are also known as Taylor-Gortler vortices. The blue vortex tubes Y represent the vortex cores to the vortex array that link all the individual outer cavity vortices together.
Figure 13:
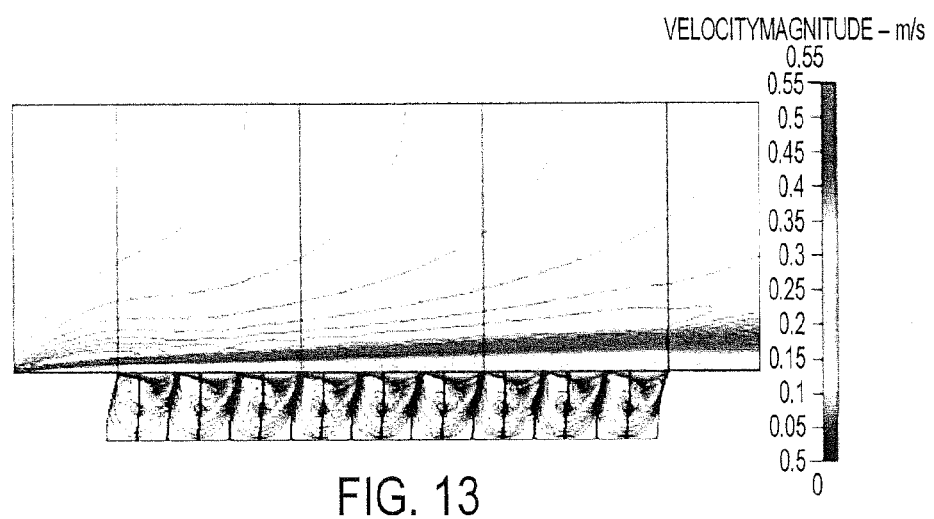
FIG. 13 is a graphical illustration of a two-dimensional computational fluid dynamics (CFD) numerical calculation through a line of symmetry over the peaks and valleys of the roughness elements in drag reduction mode. The cavity Re for this calculation is 2000, and the formation of stable cavity vortices is observed.
Figure 14:
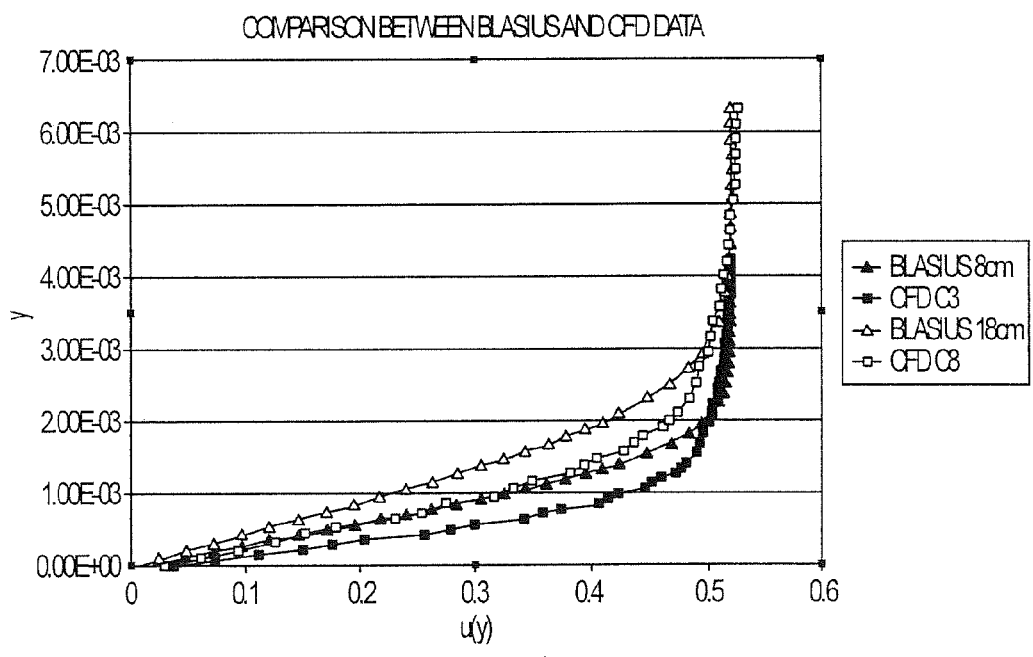
FIG. 14 is a graphical illustration of the velocity profiles in the boundary layer forming over the surface in FIG. 13 above the third and eighth cavities. These profiles are compared to that of a flat plate boundary layer, known as the Blasius solution. One can observe the non-zero velocity over the surface of the cavities due to the embedded cavity vortex. One skilled in the art will appreciate that one can obtain the momentum thickness of the two boundary layers, which is proportional to the total drag coefficient on the plate from the leading edge to that corresponding downstream distance, by integrating these velocity profiles. In one example, the momentum thickness over the third cavity is 16.09% of the momentum thickness of the flat plate Blasius solution, while at the eighth cavity the percentage of the momentum thickness of the surface with cavities with respect to the flat plate solution is 23.91%. Thus, at the third and eighth cavity, the drag coefficient is reduced by 84% and 76% correspondingly.
Figure 15:
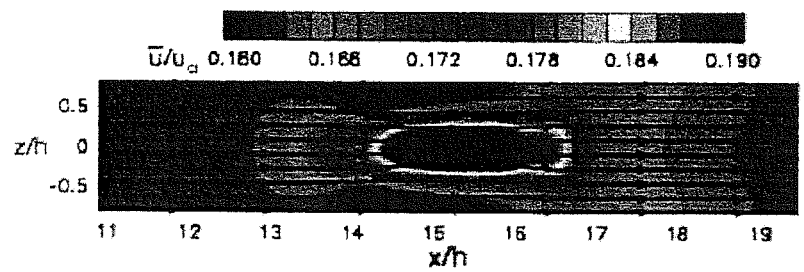
FIG. 15 illustrates isocontours of streamwise velocity in a laminar flow just over one open cavity in a periodic array. Upstream of the cavity the flow is uniform. Over the cavity, the flow speeds up as there is little viscous drag. The speed-up in fact begins about one cavity width, h, upstream and extends laterally by a fraction of h. The isocontours of streamwise velocity are at a height of 0.1 h above cavity surface in a laminar flow and the slot width Re=4 is based on the peak streamwise velocity in the slot exit plane.

In the arrays discussed above, the formed channel 34 between adjoining roughness elements 20 allows for some of the reversed flow at the bottom of the cavities between adjacent span-wise extending ridges of lines of the roughness elements to head back upstream to the adjacent, neighboring cavity through the channels between the roughness elements. In operation, a cavity flow may result such that fluid particles stay in the cavities to continue the circulatory pattern between the two cavities, i.e., entering the downstream cavity over the top of the valley to return back to the upstream cavity through the gap beneath the valley as shown in FIG. 11. The juncture of the two adjoining roughness elements acts as a center for each individual cavity vortex and may also allow for a secondary pair of vortices to form inside the larger cavity vortex, which is also shown in FIG. 11. Referring to FIG. 12, these vortices, one inside each transverse half cavity, provide a means of interlocking all of the cavity flows together in an almost chain-link type array of streamlines that are relatively stable and are not subject to cavity influx/efflux of flow, which leads to an increase in drag for the d-type surface. As noted above, the micro-geometrical patterning of a surface in embodiment for maximum drag reduction mode results in the formation of an array of embedded cavity flows (or vortices) between the roughness elements.

It is contemplated that the flow arranged by this roughness element is a series of micro-slip walls in which the orange ovals in FIG. 12 denote each micro-slip wall. From another standpoint, it is contemplated that the roughness element of the present invention alters the no slip condition which the outside flow sees at the wall. Further, it is known that embedded cavity flow can be used as a means of separation control due to the alteration of the no-slip condition at the surface. It is contemplated that the roughness element described herein can be used in applications that would reduce the pressure drag associated with separated flows over surfaces.

In a further aspect of the "roughness" surface, the thickness of the boundary layer can be in a range of at least 10 to 30% of a cavity height of each cavity such that shear layer instabilities of cavity vortexes that form therein the plurality of cavities are reduced. Preferably, the thickness of the boundary layer is about at least 20% of the cavity height. Typically, cavity height would be measured from the surface 2 of the object to the peak or highest amplitude of the roughness elements that form the transversely disposed ridge. In one aspect, each formed cavity vortex can have a Re, relative to the cavity height, velocity of the fluid over the wall surface, and the kinematic viscosity of the fluid, in the range of between 100 and 20,000, such that the instability of the formed cavity vortexes are suppressed. Optionally, each formed cavity vortex can have a Re, relative to the cavity height, velocity of the fluid over the wall surface, and the kinematic viscosity of the fluid, in the range of between 1,000 and 5,000.

The micro-arrays of the roughness elements of the present invention would find applicability in drag reduction modalities, such as, for example and not meant to be limiting, on the surfaces of aircraft, submarines, ship hulls, high speed trains and the like. In the case of the flow over the hull of a ship, the micro-arrays of the roughness elements can impact the boundary layer formation over the hull and therefore affect the amount of air ingested below the water line, thereby altering the entire flow field of a ship's wake. It is also contemplated that the micro-arrays can be used in pipeline walls as well, which would result in a large reduction in the amount of energy saved to pump fluids from one point to another.

It is also contemplated that the micro-arrays of the present invention allows for the trapping of pockets of air inside the cavities such that, for example, in hydrodynamic applications, the working fluid for the micro-slip walls would consist of these air pockets. This would also reduce the skin friction for hydrodynamic applications and, in another aspect, can reduce cativation.

Still further, the micro-arrays of roughness element can act as a means of controlling separation. The effect of the arrays acts to reduce pressure drag over bluff bodies such as automobiles and trucks. It can also minimize separation over turbine blades, airfoils, and helicopter rotors as well as flow through serpentine ducts, which is often a requirement for inlet geometries for engines on an aircraft. Optionally, in a drag enhancement mode, a surface formed with the micro-array of roughness elements of the present invention allows for highly effective convective cooling to the surfaces of computer board components, which could greatly impact the performance of these devices.

It is also contemplated that the self-cleaning property of the roughness elements should be excellent due to the high shear rates resulting over the major portions of the surfaces of the roughness elements. However, it is also contemplated to use hydrophobic materials in constructing the roughness elements for hydrodynamic applications.

It is contemplated that a surface formed with a micro-array of roughness element as described above, could be formed for a saw tooth wavelength that corresponds to that of the optimal perturbation wavelength for the shear flow inside the boundary layer. In this example, the alignment or alternation of the peaks to achieve maximum heat transfer rates and maximum drag at a surface is considered. In one aspect, the alternation of the peaks forces the half-wavelength of the saw tooth amplitude to correspond to the optimal perturbation wavelength. Thus, it is contemplated that the formed drag reducing surface could become drag enhancing as the flow speed is increased.

Referring now to FIGS. 15-18, in an alternative embodiment, a method for reduction in skin friction drag comprises an array 50 of three-dimensional micro-cavities 52 that are configured to form an array of stable, embedded cavity vortices such that a three-dimensionally patterned partial slip condition is produced over the surface. This complex boundary condition passively forces the boundary layer flow and results in sub-laminar skin friction. In another aspect, the formed boundary condition can act to delay transition to turbulence within the boundary layer.

For background, it is well known that an open cavity will form either a single cavity vortex or a system of cavity vortices, depending on the aspect ratio of the cavity. A thorough review of much of the relevant studies to date regarding rectangular cavity flows was given by Yao et al. (2004), who also performed simulations of the boundary layer flow over various aspect ratio three-dimensional rectangular cavities. It was determined that, for square cavities with a length three times the cavity depth, for a fixed Re, that given a sufficiently thick boundary layer (at least 20% of the cavity depth in their case) a stable cavity flow resulted such that no fluid exchange with the outer boundary layer flow was observed. Thinner boundary layer thicknesses, in this case, resulted in the formation of Kelvin-Helmholtz (KH) instabilities within the shear layer forming over the top of the cavity combined with the development of Taylor-Gortler (TG) vortices also forming as a secondary flow pattern within the cavity vortex flow field. Some observations for shallower cavities, under these unsteady conditions, also indicated the presence of streamwise vortex structures forming downstream of the cavity within the boundary layer flow.

Other work relating to the laminar boundary layer flow over a single, approximately two-dimensional, transverse embedded cavity has been performed. Early numerical results by Gatski & Grosch (1985) looked at the drag force (both due to pressure and skin friction) over a single embedded square cavity. The conclusion of this work indicated that the presence of a single embedded cavity did not appreciably alter the drag characteristics of the flow. However, they did pose the question as to whether closely spaced cavities could have a different result (increased drag reduction) due to leading and trailing edge surfaces no longer sustaining the increase in shear stress above the values associated with a flat plate. Finally, they also reported that the flow in the vicinity of the cavity had a smaller momentum thickness than that over the flat plates.

The negative effect of enhanced receptivity for a two-dimensional ribbed roughness that is typically observed could be logically attributed to the amplification of the T-S waves by a periodic 2-D forcing from variation in the shear stress as the flow passes over the tops of the roughness elements. In one aspect of the present invention, it is contemplated that a 3-D periodic forcing can be imposed by the roughness elements. In one aspect, significant sub-laminar drag over the surface can be achieved by minimizing the separation distance between the cavities (with the surface being substantially structurally sound). Further, the methodology can act to reduce the boundary layer receptivity and delay of transition. In one preferred aspect, the surface is specifically patterned to facilitate interference with the growth process of the most unstable waves.

One other conventional type of cavity, which has been widely studied due to the beneficial effects in both heat transfer applications and separation control (i.e., golf balls), is the spherical recess or dimple. Numerical and experimental studies clearly show the formation of a horseshoe vortex such that flow is injected into the cavity and ejected at the sides of the cavity where the trailing vortex legs are observed to form. It can be concluded from the experimental studies that cavities with variation in depth, such as the dimple, will produce a variation in the size of the vortex across the cavity and the formation of a horseshoe vortex system capable of facilitating the injection/ejection of fluid into/out of the cavity. In other words, the low pressure vortex center is drawn up towards the side of the cavity where fluid is easily injected into the cavity flow vortex from the outer free stream flow. Finally, it is well known that dimples placed on the flat plate in a turbulent boundary layer or channel flow result in increased heat transfer with only a slight drag augmentation. The increase in heat transfer is attributed to a secondary flow associated with the formation of a horseshoe vortex pair system, similar to that previously discussed in the laminar flow case, observed within and around the dimples that causes fluid to be pumped into and out of the cavity. Yet because there is no surface protrusion into the flow to increase pressure drag, the friction over dimpled surfaces is not dramatically increased. Additionally, transition of the boundary layer for the dimpled surface was found to remain about the same as a smooth plat, e.g., at a local Re of about $3 \times 10^6$.

In a further aspect of this embodiment of the present invention, the methodology contemplates the use of a cavity 52 having a substantially constant depth. The constant depth cavity helps to form and maintain a stable cavity flow, with no influx/efflux of fluid.

Reduction in skin friction drag over a surface can be achieved by delaying the transition of the boundary layer from the laminar to turbulent state. This is due to the fact that a laminar boundary layer has significantly lower shear stress at the surface than a turbulent one, and attempts to delay transition are labeled as laminar flow control (LFC). The typical method to maintain laminar flow is through the use of suction. Alternatively, discrete roughness elements (DRE) can be used. It has been found that, through the use of small cylindrical DRE strategically located on the surface of a plate, Tollmien-Schlichting (TS) instability waves that are known to lead to natural transition in a flat plate boundary layer can be suppressed. This can be achieved due to the formation of steady, optimal low and high speed streaks across the boundary layer of moderate amplitude, which are found to suppress the instabilities forming on the TS waves that lead to the formation of turbulent spots. It has also been shown that roughness elements, spaced with spanwise wavelengths shorter than that corresponding to the most amplified disturbance in the boundary layer, can act as a means of delaying transition in the case of swept wing boundary layers whereby the cross-flow instability is suppressed.

In one aspect of the present invention, a microgeometry 60 is formed in the surface that is exposed to the flow of fluid. In one example, the microgeometry 60 can comprise a three-dimensional array 50 of micro-cavities 52 such that the cavity Re remains small (about on the order Re=2000±500) and the boundary layer forming over the cavity is sufficiently thick. Such a formed microgeometry insures that the centrifugal instability, leading to the formation of Taylor-Gortler vortices, in the cavity flow as well as any instability of the shear layer (Kelvin-Helmholtz instability) forming over the cavity openings is prevented. The result is a stable cavity flow, with no influx/efflux of fluid. The resulting partial slip condition, formed at the boundary separating the cavity flow fluid and outer flow fluid, results in reduced momentum thickness within the boundary layer.

In one experimental example, the alteration of the momentum thickness was confirmed and resulted in a reduction of drag coefficient at a distance 18 cm downstream from 0.01736 for the Blasius solution to 0.00415 sustained over the first eight cavities (75% reduction).

Previous studies have also focused on MEMS-based flow control. It had been found by Choi et al. that applying wall-normal opposition flow control continuously over a surface could be made to dramatically damp near-wall turbulent fluctuations and thus reduce turbulent viscous drag. This study used (a) single discrete actuators consisting of a deep, narrow, sharp-lipped cavity with a membrane-like actuation inside and detection of normal velocity at 10y+ above the cavity, (b) a spanwise row of such actuators/detectors, (c) arrays of 18 such actuators/detectors, and (d) similar actuators but with different means of on-wall detection shear stress just upstream of the respective actuators. The study found that drag reductions occurred and that such discrete devices could modestly control the flow.

In another aspect of the studies, the flow in a plane just above an open cavity was examined. Even if the flow over the surface is completely laminar, the study found, as exemplarily shown in FIG. 15, that the above flow experiences a slip-like boundary condition over the cavity itself. Downstream of the cavity the flow speed drops rapidly but there is an indication of a lateral interaction region where the flow speed is elevated and the shear stress on the solid wall would be elevated. As the flow over the cavity speeds up, there is a slight convergence of streamlines observed. Over the cavity the high speed region in red is evidence of a slip-like boundary condition seen by the above flow. Over the surrounding solid region, the contours are direct indicators of shear stress. The pattern becomes more asymmetric as the Reynolds number is increased. With 15% area coverage by such slots, only a couple of percent total drag reduction was found, but it is contemplated that a surface having a larger percentage of open area would produce larger drag reductions.

Yet another study focused on the creation of a slip surface over a cavity exposed to a flow of water. In this study, the cavity is capped with a bubble. It was found that, as long as the bubble was substantially free of contaminants, the water flow virtually slips over the smooth surface. This methodology is described in U.S. Pat. No. 7,044,073, which is incorporated herein in its entirety by reference.

Figure 16:
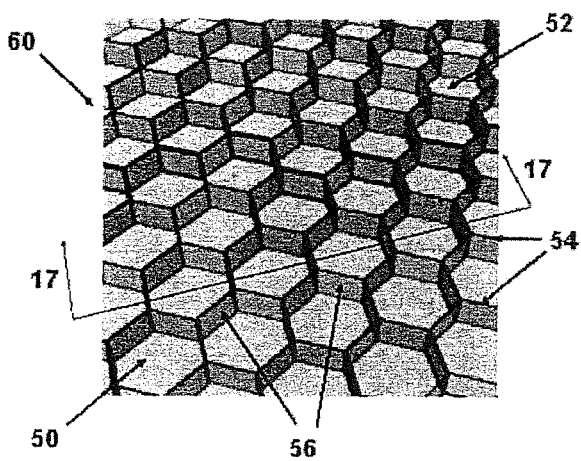
FIG. 16 shows a perspective view of an exemplary honeycomb patterned micro-cavity surface.
Figure 17:
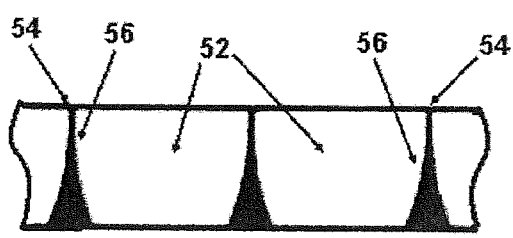
FIG. 17 shows a partial cross-sectional view of the exemplary honeycomb patterned micro-cavity surface of FIG. 16 taken across line 17-17. This example showing the wall of the cavities configured with a parabolic profile such that the edges of the cavities are minimal in size.

In various aspects, it is contemplated that the cavities 52 of the microgeometry 60 can comprise a substantially cubic design, a honeycomb structure, as shown in FIG. 16, and the like. These shapes are merely exemplary and no limitation on the geometric shape of the cavities of the surface is intended.

In another aspect, a method/system for facilitating a controlled point of transition in the boundary layer and/or delaying transition is provided. In one aspect, a plurality of discrete roughness elements (DRE) can be spaced in the spanwise direction of the surface at the optimal wavelength. This structure will cause streamwise vortices and low-speed streaks of sufficient amplitude (such that breakdown to turbulence will take place over a flat plate) to be generated through the transient growth mechanism.

In another aspect, a small spanwise slit is provided in the surface through which, via an alternation of suction and pumping of fluid, TS waves in the most unstable frequency range are generated that lead to early transition. In still another aspect, an adverse pressure gradient for the flow over the boundary layer is set up such that early transition is promoted. This can be exemplarily achieved by placing the flat plate surface at a small angle of attack relative to the flow of fluid such that the flow over the flat plate is subjected to a diverging area and subsequently decelerates along the length of the plate.

Figure 18:
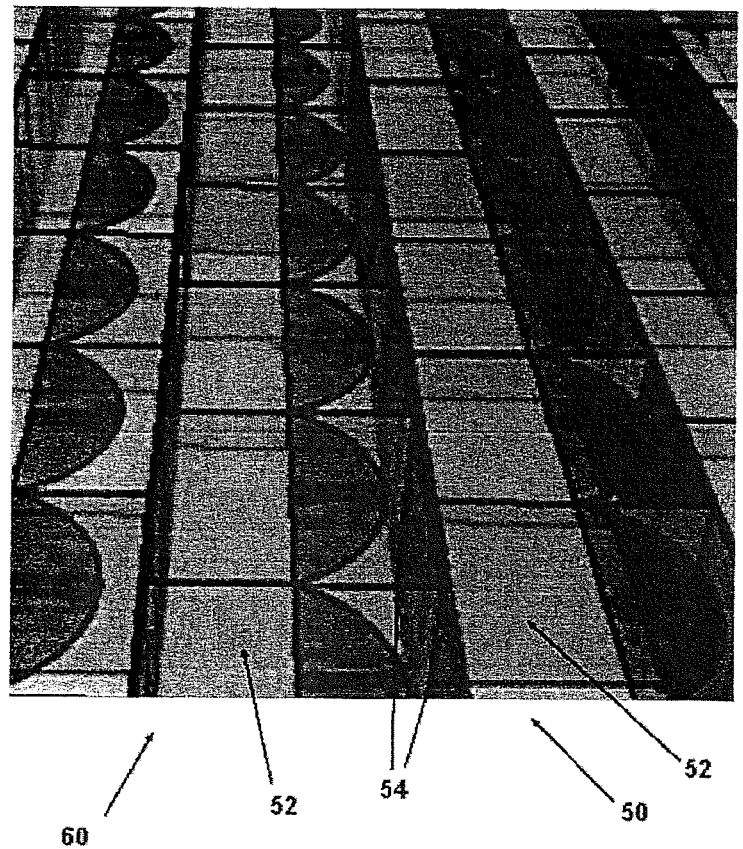
FIG. 18 shows an offset, cubic micro-cavity pattern showing the partial slip pattern (in grey with a green arrow) boundary condition created by the induced flow of the embedded vortices. This illustrates the corresponding partial slip field to which the outer flow is subjected to an exemplary three-dimensional array of micro-cavities embedded in the wall surface (the three-dimensional array of micro-cavities being shown as exemplarily as an offset, square patterned micro-cavity field). The complex partial slip condition pattern can be designed, via the geometry and sizing of the cavities, to disrupt the formation of high and low speed streaks in the near wall layer that lead to the transition to turbulence in the boundary layer.

One exemplary example of a three-dimensional array 50 of micro-cavities 52 embedded in the surface is the corresponding partial slip field to which the outer flow is subjected, is shown in FIG. 18 for an offset, square patterned micro-cavity field. It is contemplated that this complex partial slip condition pattern can be configured, via the geometry and sizing of the cavities, to disrupt the formation of high and low speed streaks in the near wall layer that lead to the transition to turbulence in the boundary layer. In one aspect, the partial slip pattern favors the streamwise direction, and according to the computations of Min & Kim (2005), a surface dominated by streamwise slip has the highest potential for transition delay. Thus, the exemplary microgeometry of the present invention disrupts the formation of the low-speed streaks and reduces the momentum thickness of the boundary layer. It should be noted that this higher momentum in the flow closer to the surface is favorable also in delaying separation of the boundary layer under adverse pressure gradient conditions (Gad-el-Hak, 2000).

This embodiment of the present invention thus contemplates the use of a microgeometry 60 that can comprise an array 50 of cavities 52 in which embedded cavity flows form. The array 50 of cavities 52 being configured to cause transition delay in boundary layer flows and to reduce skin friction drag. It is contemplated that the methodologies/systems of the present invention that use such an embedded micro-cavity surface lead to sub-laminar boundary layer skin friction coefficients and correspondingly smaller momentum thickness. While two primary cavity geometries, cubic and hexagonal have been discussed herein, it is contemplated that these shapes are not meant to be limiting and that other geometric shapes can be used, perhaps in combination.

In a further aspect, at least a portion of the edges 54 of cavities 52 that are substantially aligned with the flow of fluid over the surface can have upwardly extending ribs that are connected to and extend outwardly from the top edges 58 of the cavity. In another aspect, portions of the plurality of cavity walls 56 of the cavities can extend upwardly above the generalized plane of the surface to form wall extensions. Thus, in one aspect, the wall extensions would protrude into the flow of fluid above the plane of the surface only on those cavity walls 56 that were aligned with the fluid flow direction. In various aspects, the wall extensions could extend partially or along the substantial length of the portion of the cavity walls that are aligned with the fluid flow direction. Further, the height of the wall extension above the generalized plane of the surface can be a multiple of the depth of the cavity. It is contemplated that this multiple can range between about 0 to about 4. It is contemplated that the outwardly extending extensions or ribs would beneficial inhibit cross-flow near the surface and perhaps cavity influx/efflux.

In another embodiment of the application, it is known that separation of the boundary layer from the body typically occurs in vicinities where the flow is decelerating due to change in body curvature, which results in an adverse pressure gradient. Thus, separation typically occurs in areas that are posterior of the maximum body thickness. Incipient separation is characterized by regions of decreasing skin friction approaching zero, and consequent reversal of the flow at the surface. A similar process, known as dynamic stall, characterizes unsteady separation from a moving surface producing lift (i.e., a pitching airfoil) or thrust (i.e., an oscillating caudal fin). Unsteady separation is characterized by a locality where both the shear stress (or skin friction) and velocity approach zero as seen by an observer moving with the separation point (known as the MRS criterion). In this case, a separated region is most likely to occur near the point of highest curvature (typically near the leading edge) prior to blending with the wake near the trailing edge. If such separation occurs in the latter case, lower propulsive efficiencies typically result. However, if the unsteady separation process can be controlled, such that the leading edge separation bubble remains disconnected with the wake then an unsteady high-thrust (or high-lift) generation mechanism can occur.

Figure 19:
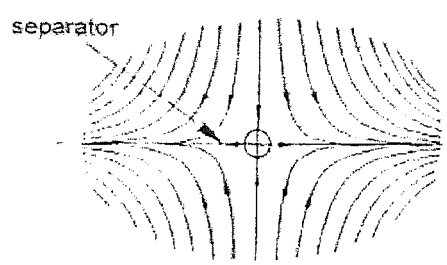
FIG. 19 shows a typical convergence pattern of skin-friction lines leading towards a three-dimensional separation line. When three-dimensionality is added to the separation flow kinematics, boundary layer separation does not always coincide with a point of zero shear stress at the wall. In fact, the shear stress may vanish only at a limited number of points along the separation line, and a convergence of skin-friction lines onto a particular separation line is required for separation to occur.

In a further embodiment, when three-dimensionality is added to the separation flow kinematics, the boundary layer separation does not always coincide with a point of zero shear stress at the wall. In fact, and as shown in FIG. 19, the shear stress may vanish only at a limited number of points along the separation line, and a convergence of skin-friction lines onto a particular separation line is required for separation to occur. As a result, 3D boundary layers can be more capable of overcoming an adverse pressure gradient without separating. Thus, in this embodiment, it is contemplated that the respective micro-geometries of the micro-array of roughness elements are configured in a preferential flow direction. This configuration can prevent the required convergence of skin friction lines and can passively act to keep the flow attached, thereby reducing pressure drag.

As contemplated, delaying separation of the flow from a solid boundary results not only in reduced pressure drag, but also decreased pressure losses in ducted flows such as through diffusers and turning elbows. Various mechanisms by which separation can be controlled have been investigated and successfully applied in the past. Many of these techniques require the application of suction and/or blowing at the surface and require energy input.

The micro-geometries of each of the roughness elements can be configured to successfully control separation. In this aspect, the micro-geometries act to impart momentum to the very near-wall region of the flow, which prevents flow reversal. This can be achieved by the formation of embedded cavity vortices as shown in red in FIG. 20. One of the most successful passive means to date has been the use of vortex generators, or small typically v-shaped protrusions with profiles less than half the boundary layer thickness. These have been shown to produce a system of streamwise vortices, which mix high and low momentum fluid that energizes the flow close to the surface. Vortex generators need to be placed at a specific downstream location within a turbulent boundary layer for maximum performance such that the streamwise vortices affect the region where separation would normally occur.

As described above, patterned surfaces can also result in separation control and golf ball dimples present one of the most well-known illustrations of surface patterning resulting in separation control and reduced drag. However, the dimples do more than just trip the boundary layer to the turbulent state. It has been shown that the formation of embedded cavity vortices, or small, localized regions of separation within the surface allows the outer boundary layer flow to skip over the dimples in the pattered surface. Thus, the use of patterned surfaces, capable of imposing partial-slip flow conditions at the wall due to the formation of embedded vortices, can achieve drag reduction via separation control.

In addition, and as contemplated herein, if a surface has a preferred flow direction, which can exemplarily be felt by moving one's hand over the surface. Movement in the direction of preferred flow fit would feel smooth to the touch. But, when the preferred direction surface is felt in the opposite direction, a higher resistance is imposed and the surface feels rougher. Thus, this aspect acts to enhance the boundary layer control mechanism of the micro-geometries by providing a preferential flow direction of the surface that is capable of locally resisting the reversal of flow at or near the surface. Therefore, the configured surface has the potential to disrupt the convergence of skin-friction lines onto a particular separation line, which controls three-dimensional separation. The contemplated micro-array of roughness elements, with the exemplary preferred flow direction micro-geometries can aid in separation control and or transition delay.

Figure 21A:
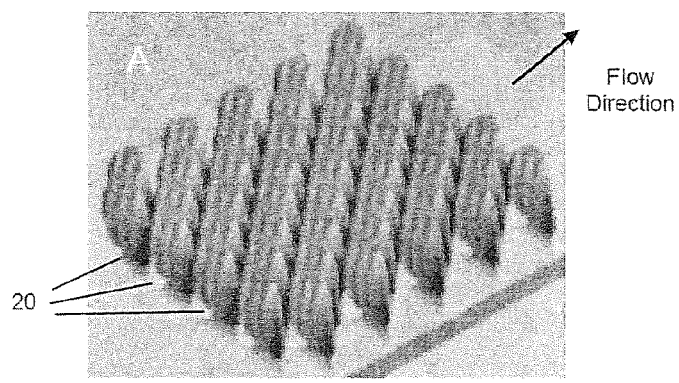
FIGS. 21A-B shows an exemplified micro-array of roughness elements built for water testing.
Figure 21B:
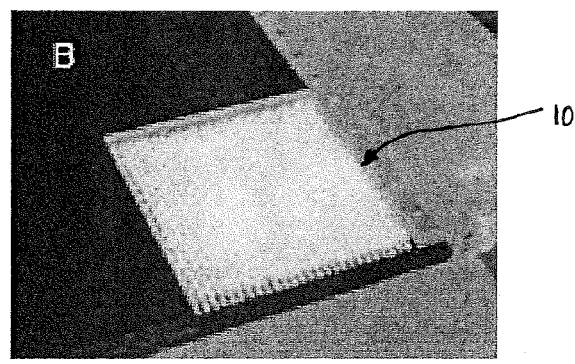

Flow experiments have been conducted on an exemplary model array surface, shown in FIGS. 21A and 21B. In this exemplary array of roughness elements, a 16×24 array of roughness elements were scaled up from 0.2 mm to 20 mm for the model. Similarity of the cavity flow is achieved by matching the cavity Re~2800 between real application at higher velocities and model (the scale-up in size is countered by a scale-down in velocity over the surface from 14 m/s to 14 cm/s with negligible change in viscosity). In one experiment, a long flat plate (~180 cm) with an elliptic leading edge was used to grow the boundary layer sufficiently thick such that shear layer instabilities over the cavity vortices were not observed to develop. It has been shown that a vortex forming in a square cavity remains stable at Re=10,000 as long as the boundary layer thickness was more than roughly 20% of the cavity depth.

Figure 21C:
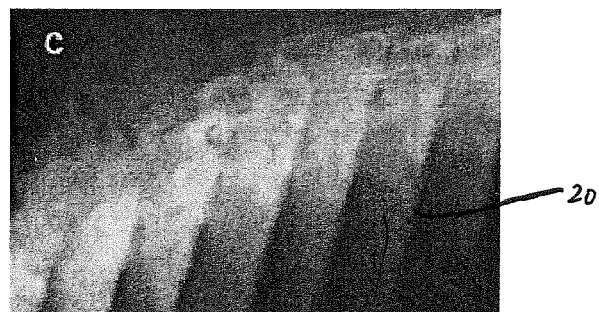
FIG. 21C shows fluorescent dye visualization of embedded vortices forming in the exemplary roughness surface shown in FIGS. 21A and 21B.
Figure 22A:
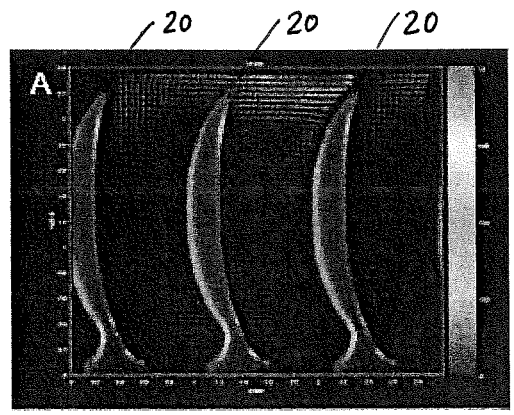
FIGS. 22A-22C show velocity vectors of flow over the model shown in FIG. 21A.
Figure 22B:
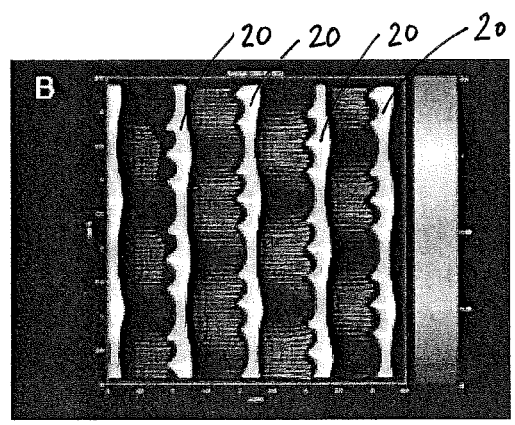
Figure 22C:
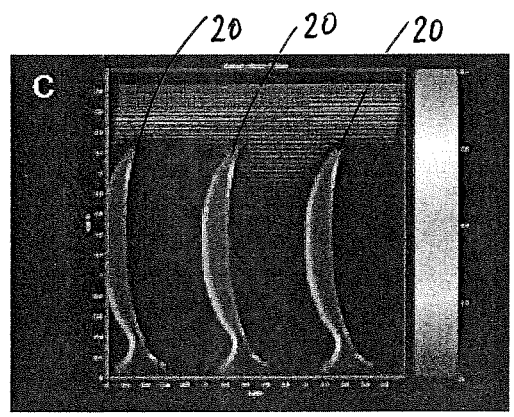
Figure 23:
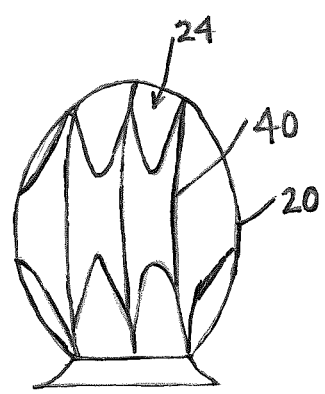
FIG. 23 illustrates the rear surface of the roughness element shown in FIG. 6.

Referring to FIG. 21C, the experimental results confirmed the presence of cavity vortices within the micro-array. The results also show that with the sufficient growth of a boundary layer upstream of the model (local Re=$2\times10^5$), transition is not tripped by the surface and the flow skips over the cavities. Referring now to FIG. 22A-22C, a time-resolved digital particle image velocimetry system was used to capture 2D velocity data within and above the exemplified micro-array surface. In FIG. 22A, the middle roughness element corresponds to a valley in the configuration geometry, and the first and third elements to peaks. In this exemplary aspect, the flow accelerates over the cavity spanning the first and third denticles or roughness elements, with the primary formation of vorticity being measured in front of the third denticle (flow being from left to right in the figure). In this example, and as shown in FIG. 22B, the flow accelerates as it passes over the cavity between the denticles and reaches speeds on the order of 5-10% of the freestream flow (U) and has an average velocity in the y=0 plane of 0.03U. In the purely flat surface case, the no slip condition at y=0 enforces a zero velocity boundary condition to the boundary layer flow.

It is contemplated that the flow velocity at the streamline separating the cavity flow from the outer boundary layer flow will further increase concomitantly with a decrease in the boundary layer thickness (in the current exemplary case this is about 21 mm, or roughly the same size as the cavity depth and thus a fairly thick boundary layer is used for these results). In the case where the boundary layer is tripped prior to the configured denticle model this increases to an average velocity in the y=0 plane of 0.14U as a result of the higher momentum closer to the surface from the presence of the turbulent boundary layer above the denticle model. As shown in FIG. 22C, periodic exchange of fluid is observed in the turbulent boundary layer case between the cavity flow and boundary flow, but on average the flow displays only a streamwise component above the cavity. These results are consistent with the cavity flow exchange observed in two-dimensional transverse ribbed surfaces. Thus, it is contemplated that a micro-array of erect roughness elements leads to higher momentum in the fluid at y=0 for both laminar and turbulent boundary layer conditions which makes such a roughness surface a good candidate as a mechanism for separation control.

In one aspect, it is contemplated that the roughness elements described herein can be positioned at an angle relative to the flow of fluid across the roughness surface. The example shown in FIG. 22A, illustrates an exemplary roughness element that is extending substantially normal to the flow of fluid. It is contemplated that the roughness element can be positioned at a selected angle or angles relative to the flow such that a preferential flow direction surface is formed.

Figure 20:
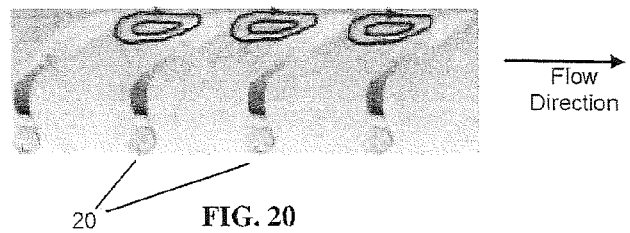
FIG. 20 shows the theorized cavity vortices which should form between adjacent roughness elements for angled configurations. In this example of a passive micro-roughness array with preferential flow direction, transverse triangular roughness elements extend into the flow at an angle between 0 and 90 degrees. The figure illustrates an exemplary array of roughness elements in which the crown of each respective roughness element is positioned at an angle of about 40 degrees with respect to the flow. Preferred flow direction is from left to right in the figure and the red lines represent embedded vortices that would form between adjacent roughness elements.

Positioning the roughness elements at more acute angles will result in shallower cavity areas that are conducive to embedded vortex formation within the geometry. As the angle increases toward normal, the inter-element cavity distance between the roughness elements increases. FIG. 20 shows the theorized cavity vortices, which should form between adjacent roughness elements for angled configurations. The vortices that form may be more shallow and oblong in nature than previously reported. Yet, even in very shallow circular depression roughness, such as dimples on a golf ball, the existence of a cavity vortex is found to occur even at low Re. It is postulated that the primary mechanism by which separation control is achieved is the partial slip over the embedded cavity vortices. However, small-scale mixing of fluid into and out of the cavities may also provide an additional mechanism delaying or preventing separation for turbulent or transitioning boundary layer conditions.

Experimentally, flow visualization and DPIV measurement can be used to look for anisotropy in the near-wall motions with restriction of the spanwise momentum and increase in the streamwise momentum, alteration to the time-averaged Reynolds stresses in the vicinity close to the surface, decrease in the growth rate of turbulent spots, and decrease in the spatial density of turbulent spots. All of the above are good indicators that the microgeometry is working to delay the latter stages of transition.

The preceding description of the invention is provided as an enabling teaching in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. The corresponding structures, materials, acts, and equivalents of all means or step plus function elements in the claims below are intended to include any structure, material, or acts for performing the functions in combination with other claimed elements as specifically claimed.

Accordingly, those who work in the art will recognize that many modifications and adaptations to the present invention are possible and can even be desirable in certain circumstances and are a part of the present invention. Other embodiments of the invention will be apparent to those skilled in the art from consideration of the specification and practice of the invention disclosed herein. Thus, the preceding description is provided as illustrative of the principles of the present invention and not in limitation thereof. It is intended that the specification and examples be considered as exemplary only, with a true scope and spirit of the invention being indicated by the following claims.

REFERENCES

Anderson, E., McGillis, W. & Grosenbaugh, M. 2001. The Boundary Layer of Swimming Fish. *J. Exp. Biology* 204: 81-102

Bandyopadhyay, P. 1988 Resonant Flow in Small Cavities Submerged in a Boundary Layer. *Proc. R. Soc. Lond. A* 420:219-245

Balasubramanian, A., Miller, A., Traub, L., & Rediniotis, O. 2003. Biomimetic Nanostructure Skin for Hydrodynamic Drag Reduction. *AIAA Pap.* 2003-785, AIAA, Reno, Nev.

Bechert, D. W., Bartenwerfer, M. & Hoppe, G. 1986. Drag Reduction Mechanisms Derived from the Shark Skin. ICAS Congress, 15th, London, 1044-1068

Bechert, D. W., Bruse, M., Hage, W., Van der Hoeven, J. & Hoppe, G. 1997. Experiments on Drag-Reducing Surfaces and their Optimization with an Adjustable Geometry. *J. Fluid Mech.* 338:59-87

Bechert, D. W., Bruse, M., Hage, W. & Meyer, R. 2000, Fluid Mechanics of Biological Surfaces and their Technological Application. *Naturwissenschaften* 80:157-171

Bechert, D. W., Hoppe, G. & Reif, W. E. 1985. On the Drag Reduction of the Shark Skin. AIAA Shear Flow Control Conference, March 12-14, Boulder, Colo., *AIAA Paper* 85-0546

Bechert, D. W., Hage, W., Brusek, M. 1996. Drag Reduction with the Slip Wall. *AIAA Journal* 35(5):1072-1074

Bernard, P. & Wallace, J. 2002. *Turbulent Flow: Analysis, Measurement & Prediction*. John Wiley & Sons, Inc., Hoboken, N.J.

Blake, R. 2004. Fish Functional Design and Swimming Performance. *J. of Fish Biology* 65:1193-1222

Boiko, A., Grek, G., Dovgal, A. & Kozlov, V. 2002. *The Origin of Turbulence in Near-Wall Flows*. Springer-Verlag, Berlin.

Boiko, A., Kozlov, V., Scherbakov, V. & Syzrantsev, V. 1997. Transition Control by Riblets in a Swept Wing Boundary Layer with an Embedded Streamwise Vortex. *Eur. J. of Mech. B, Fluids* 16(4):465-482

Brehmer, M. Conrad, L. & Funk. L. 2003. New Developments in Soft Lithography. *J. of Disp. Sci & Tech.* 24(3/4): 291-304

Breuer, K., Park, J., & Henoch, C. 2004. Actuation and Control of a Turbulent Channel Flow using Lorentz Forces. *Phys. of Fluids* 16(4):897-907

Bruse, M., Bechert, D., van der Hoeven, J., Hage, W. & Hoppe, G. 1993. Experiments with Conventional and with Novel Adjustable Drag-Reducing Surfaces. *Proc. of the Int. Cong. On Near-Wall Turbulent Flows*, Tempe, Ariz., 719-738

Bushnell, D. 1983 Turbulent Drag Reduction for External Flows, *AIAA Paper* 83-227

Bushnell, D. & Moore, K. 1991 Drag Reduction in Nature. *Ann. Rev. Fluid Mech.*, 23:65-79

Chernyshov, O. & Zayets, V. 1970. Some Peculiarities of the Structure of the Skin of Sharks. *Bionika* 4:77-83

Choi, H., Moin, P. & Kim, J. 1993. Direct Numerical Simulation of Turbulent Flow over Riblets. *J. Fluid Mech.* 255: 503-539

Choi, K. & Fujisawa, N. 1993 Possibility of Drag Reduction using d-type Roughness. *App. Sci. Res.* 50:315-324

Choi, K. 2000. Europena Drag-reduction Research—Recent Developments and Current Status. *Fluid Dyn. Res.* 26:325-335

Choi, J, Jeon, W. & Choi, H. 2006. Mechanism of Drag Reduction by Dimples on a Sphere. *Phys. of Fluids* 18 (041702):1-4

Colgate, J. & Lynch, K. 2004. Mechanics and Control of Swimming: A Review. *IEEE J. of Ocean Eng.* 29(3):660-673

Corebett, P. & Bottaro, A. 2000. Optimal Perturbations for Boundary Layers Subject to Stream-wise Pressure Gradient. *Phys. of Fluids* 12 (1):120-131

Davies, C. & Carpenter, P. 1997. Numerical Simulation of the Evolution of Tollmien-Schlichting Waves over Finite Compliant Panels. *J. Fluid Mech.* 335:361-392

Delery, J. 2001. Robert Legendre and Henri Werle: Toward the Elucidation of Three-Dimensional Separation. *Ann. Rev. Fluid Mech.* 33:129-154

Djenidi, L., Anselmet, F. & Antonia, R. 1999. The Turbulent Boundary Layer over Transverse Square Cavities. *J. Fluid Mech.* 395:271-294

Doligalski, T., Smith, C. & Walker, J. 1994. Vortex Interactions with Walls. *Ann. Rev. Fluid Mech.* 26:573-616

Donley, J. M., Sepulveda, C. A., Konstantinidis, P., Gemballa, S., Shadwick, R. E. 2004. Convergent Evolution in Mechanical Design of Lamnid Sharks and Tunas. *Nature* 429: 61-65

Fish, F., 1998. Imaginative Solutions by Marine Organisms for Drag Reduction. *Proceedings of the International Symposium on Seawater Drag Reduction*, 1-8.

Fish, F. 2006. The Myth and Reality of Gray's Paradox: Implication of Dolphin Drag Reduction for Technology. *Bioinsp. Biomim.* 1:17-25

Fish, F. & Lauder, G. 2006. Passive and Active Flow Control by Swimming Fishes and Mammals. *Ann. Rev. Fluid Mech.* 38:193-224

Fransson, J., Talamelli, A., Brandt, L. & Cossu, C. 2006. Delaying Transition to Turbulence by a Passive Mechanism. *Phys. Rev. Letters* 96(6):064501-4

Fransson, J. 2004 Leading Edge Design Process using a Commercial Flow Solver. *Exps. in Fluids* 37:929-932

Fransson, J., Brandt, L., Talamelli, A. & Cossu, C. 2005 Experimental Study of the Stabilization of Tollmein-Schlichting Waves by Finite Amplitude Streaks. *Phys. of Fluids* 7(5)

Fulcher, B. & Motta, P. 2006. Suction disc performance of echeneid fishes. *Cand. J. Zool.* 84:42-50

Gad-el-Hak, M. 2000. *Flow Control: Passive, Active and Reactive Flow Management.* Cambridge University Press, Cambridge, UK.

Gatski, T. & Grosch, C. (1985) Embedded Cavity Drag in Steady Laminar Flow *AIAA Journal* 23:1028-1037

Grek, G. Kozlov, V. & Titarenko, S. 1995. The Influence of Ribltes on a Boundary Layer with Embedded Streamwise Vortices. *Phys. Fluids* 7(10): 2504-2506

Hansen, R. & Hoyt, J. 1984. Laminar-to Turbulent Transition on a Body of Revolution with an Extended Favorable Pressure Gradient Forebody. *ASME J. Fluids Eng* 106:202-210

Hebrank, M. R. 1980. Mechanical Properties and Locomotor Functions of Eel Skin. *Biol. Bull.* 158: 58-68.

Huber, D. R., Eason, T. G., Hueter, R. E., & Motta, P. J. 2005. Analysis of Bite Force and Mechanical Design of the Feeding Mechanism of the Durophagous shark *Heterodontus francisci. J. Exp. Biol.* 208: 3553-3571.

Huber, D. R. & Motta, P. J. 2004. A Comparative Analysis of Methods for Determining Bite Force in the Spiny Dogfish, *Squalus acanthias. J. Exp. Zool.* 301A:26-37.

Hess, D & Fu, T. 2003 Impact of Flow Control Technologies on Naval Platforms *AIAA paper* 2003-3586

Iuso, G., Onorato, M., Spazzini, P. & Cicca, G. 2002. Wall Turbulence Manipulation by Large-scale Streamwise Vortices. *J. Fluid Mech.* 473:23-58

Jager, W. & Mikelic, A. 2003 Couette Flows over a Rough Boundary and Drag Reduction. *Commun. Math. Phys.* 232: 429-455

Jimenez, J. 2004. Turbulent Flows over Rough Walls. *Ann. Rev. Fluid Mech.* 36:173-196

Joslin, R. (1998) Aircraft Laminar Flow Control. *Ann. Rev. Fluid Mech.* 30:1-29

Jung, W. J., Mangiavacchi, N., Akhavan, R. 1992. Suppression of Turbulence in Wall-bounded Flows by High Frequency Spanwise Oscillations. *Phys. Fluids A* 4:1605-7

Karniadakis, G. E. & Choi, K. 2003. Mechanisms on Transverse Motions in Turbulent Wall Flows. *Ann. Rev. Fluid Mech.* 35:45-62

Kim, C., Jeon. W. & Choi, H. 2005 Skin-friction Reduction by Multiple Cavities. 2005 *APS DFD Meeting*

Lang, A., Hidalgo, P. & Westcott, M. 2006. Flow over a Biomimetic Surface Roughness Geometry. *Bulletin of the 2006 APS Division of Fluid Dynamics Meeting*, Tampa, Fla.

Lang, M., Rist, U. & Wagner, S. 2004. Investigations on Controlled Development in a Laminar Separation Bubble by means of LDA and PIV. *Exp. In Fluids* 36:43-52

Lashkov, Y. & Samoilova, N. 2002. On the Viscous Drag of a Plate with Spherical Recesses. *Fluid Dyn.* 37 (2):231-236

Lee, S.-J. & Lee, S.-H. 2001. Flow Field Analysis of a Turbulent Boundary Layer over a Riblet Surface. *Exps. In Fluids* 30:152-166

Leonardi, S., Orlandi, P., Smalley, R., Djenidi, L. & Antonia, A. 2003. Channel Flow with Transverse Square Bars on One Wall. *J. Fluid Mech.* 491:229-238

Lin, J. 1999. Control of Turbulent Boundary-layer Separation using Micro-vortex Generators. *AIAA paper* 99-3404

Lin, J. 2002. Review of Research on Low-profile Vortex Generators to Control Boundary-layer Separation. *Prog. in Aero. Sci.* 38:389-420

Lingham-Soliar, T. 2006. Dorsal Fin in the White Shark, *Carcharodon carcharias*: a dynamic stabilizer for fast swimming. *J. of Morph.* 263:1-11

Liu, Z-C. & Adrian, R. J. 1999. Evidence for Hairpin Packet Structure in DNS Channel Flow. *Proc. First International Symposium on Turbulent Shear Flow Phenomena*, pp. 609-614

Martin, C. & Aksay, I. 2005. Low-*Cost Patterning of Ceramic Thin Films*. Springer, US Min, T. & Kim, J. 2004. Effects of Hydrophobic Surface on Skin-friction Drag. *Phys. Fluids* 16(7):55-4

Min, T. & Kim, J. 2005. Effects of Hydrophobic Surface on Stability and Transition. *Phys. Fluids* 17(10):108106-4

Motta. P. 1977. Anatomy and Functional Morphology of Dermal Collagen Fibers in Sharks. *Copeia* 3:454-464

Narasimha, R. & Sreenivasan, K. 1973. Relaminarization in Highly Accelerated Turbulent Boundary Layers. *J. Fluid Mech.* 61:187-199

Neumann, D. & Dinkelacker, A. 1989. Drag Reduction by Longitudinal Riblets on the Surface of a Streamwise Aligned Body of Revolution. In *Drag Reduction in Fluid Flows*, Ellis Horwood.

Pavlov, V. 2006. Dolphin Skin as a Natural Anisotropic Compliant Wall. *Bioinsp. Biomim.* 1:31-40

Ramanan, N. & Homsy, G. 1994. Linear Stability of Lid-driven Cavity Flow. *Phys. Fluids* 6 (8):2690-2701

Raschi, W. & Musick, J. 1986. Hydrodynamic Aspects of Shark Scales. *NASA Contractor Rep.* 3963

Raschi, W. & Tabit, C. 1992. Functional Aspects of Placoid Scales: A Review and Update. *Aust. J. Mar. Freshwater Res.* 43: 123-147.

Reif, W. E. 1985. Morphology and Hydrodynamic Effects of the Scales of Fast Swimming Sharks. *Fortschritte der Zoologie* 30: 483-485.

Reif, W. E. 1988. Evolution of High Swimming Velocities in Sharks—a Case of Escalation? *N. Jb. Geol. Palaont. Mh.* 6:361-379

Reif, W. & Dinkelacker, A. 1982. Hydrodynamics of the Squamation in Fast-Swimming Sharks. *N. Jahrb. Geol. Palaontol.* 164:184-187

Robey, H. 1987. On the Use of a Phased Heater Array for the Controlled Excitation of Arbitrary Three-dimensional Perturbations in a Laminar Boundary Layer. *Exps. in Fluids* 5(1):33-35

Robey, H. 1986. The Nature of Oblique Instability Waves in Boundary Layer Transition. Ph.D. thesis at the California Inst. of Tech.

Rohr, J., Latz, M., Fallon, S., Nauen, J. & Hendricks, E. 1998. Experimental Approaches Towards Interpreting Dolphin-stimulated Bioluminescence. *J. Exp. Bio.* 201:1447-1460

Saric, W., Carpenter, A., Kluzek, C., Hunt, L., McKnight, C. 7 Schouten, S. (2005) Flight Experiments on Laminar Flow Control in Swept-wing Boundary Layers 2005 *APS DFD Meeting*

Saric, W., Reed, H. & White, E. 2003. Stability and Transition of Three-Dimensional Boundary Layers. *Ann. Rev. Fluid Mech.* 35:413-440

Sass, G. & Motta, P. 2002. The Effects of Satiation on Prey Capture Kinematics in the Largemouth Bass, Micropterus Salmoides. *Env. Biol. Fish.* 65: 441-454

Savill, A, 1988 A Flow Visualization Investigation of Turbulent Boundary Layer Structure over Micro Air Bearing Surfaces including Effect of Outer Layer Manipulation. *2nd Int/Symp. On Fluid Control, Measurement Mech. And Flow Vis*. p. 430-436

Schmid, P. & Henningson, D. 2001 *Stability and Transition in Shear Flows*. Springer-Verlag, New York Schneider, P. 1989. Effects of Controlled Three-dimensional Perturbations on Boundary Layer Transition. Ph.D. thesis at the California Inst. of Tech.

Schumacher, J., Carman, M., Estes, t., Feinberg, A., Wilson, L., Callow, M., Callow, J. Finlay, J. & Brennan, A. 2007. Engineering Antifouling Microtopographies—Effect of Feature Size, Geometry, and Roughness on Settlement of Zoospores of the Green Alga *Ulva*. *Biofouling* 23(1/2):55-62

Segawa, T., Li, F., Yoshida, H., Murakami, K. & Mizunama, H. 2005 Spanwise Oscillating Excitation for Turbulence Drag Reduction using Alternative Suction and Blowing. *AIAA Pap.* 2005-488, AIAA, Reno, Nev.

Sfakiotakis, M., Lane, D. & Davies, J. 1999. Review of Fish Swimming Modes for Aquatic Locomotion. *IEEE J. of Ocean Eng.* 24(2):237-252

Sirovich, L & Karlsson, S. 1997. Turbulent Drag Reduction by Passive Mechanisms. *Nature* 388:753-755

Su, B., Zhang, D. & Button, T. 2002. Micropatterning of Fine Scale Ceramic Structures. *J. of Mat. Sci.* 37:3123-3126

Thorburn, C. 2007. Personal Communication. Video Evidence Available in *Animal Nation: Mako Sharks* available on DVD.

Tuncer, I. & Platzer, M. 1999. A Computational Study of Flow Separation Characteristics and Wake Profiles Behind a Flapping Airfoil. *AIAA paper* 99-0648

Videler, J. 1993. *Fish Swimming*. Chapman and Hall, London.

Videler, J. 1995. Body Surface Adaptions to Boundary-layer Dynamics. *Symp. of the Soc. for Exp. Bio.* 49:1-20

Vogel, S. 2003. *Comparative Biomechanics: Life's Physical World*. Princeton University Press, Princeton.

Wainwright, S. 1978. Shark Skin: A Function in Locomotion. *Science* 202:747-749

Walker, J. 2003. Unsteady Separation Processes at High Reynolds Number and their Control. *Flow, Turb. & Comb.* 71:61-74

Wang, Z, Yeo, K. & Khoo, B. 2003 Numerical Simulation of Laminar Channel Flow Over Dimpled Surfaces. *AIAA* 2003-3964

Wasserman, P. 7 Kloker, M. 2002. Mechanisms and Passive Control of Crossflow-vortex-induced Transition in a Three-dimensional Boundary Layer. *J. Fluid Mech.* 4456: 49-84

Wetzel, K. & Farokhi, S. 1996. Interaction of Vortex Generators and Riblets on an Airfoil. *AIAA paper* 1996-2428

Wintzer, A. & Motta, P. 2004. The Effects of Temperature on Prey Capture Kinematics of the Bluegill Sunfish, *Lepomis macrochirus*: implications for feeding studies. *Cand. J. Zool.* 82:794-799

Yao, H., Cooper, R. & Raghunathan, S. 2004. Numerical Simulation of Incompressible Laminar Flow over Three-dimensional Rectangular Cavities. *J. Fluids Eng.* 126:919-927

What is claimed is:

1. An aerodynamic or hydrodynamic wall surface configured to modify the interaction of a boundary layer of a fluid flowing across the wall surface, comprising:

at least one array of roughness elements disposed on and extending from the wall surface, wherein each roughness element extends outwardly from the wall surface at one or more selected angles relative to the flow of fluid across the wall surface such that a preferential flow direction surface is formed, wherein each roughness element has a front, upstream surface and an opposing rear, downstream surface and a peripheral edge that has an upper portion that tapers to a top and a bottom portion that tapers to a base, which is connected to the wall surface, wherein a plurality of roughness elements are positioned substantially transverse to the flow of fluid across the wall surface such that a distance between a medial portion of the peripheral edges of adjacent and aligned roughness elements is less than the distance between the respective tops of the roughness elements and is less than the distance between the respective bases of the roughness elements, wherein the array of roughness elements defines a plurality of cavities, wherein the thickness of the boundary layer is at least 20% of a cavity height of each cavity such that shear layer instabilities of cavity vortexes that form in the plurality of cavities are reduced, wherein each roughness element comprises at least one riblet extending outwardly therefrom the front, upstream surface of the roughness element that is configured to aid in the formation and stability of cavity flows embedded between the roughness elements, and wherein each roughness element comprises at least one riblet extending outwardly from the rear, downstream surface of the roughness element, and wherein each riblet extends substantially longitudinally.

2. The wall surface of claim 1, wherein each formed cavity vortex has a Reynolds number (Re), relative to the cavity height, velocity of the fluid over the wall surface, and the kinematic viscosity of the fluid, in the range of between 100 and 20,000, such that the instability of the formed cavity vortexes are suppressed.

3. The wall surface of claim 1, wherein each formed cavity vortex has a Reynolds number (Re), relative to the cavity height, velocity of the fluid over the wall surface, and the kinematic viscosity of the fluid, in the range of between 1,000 and 5,000, such that the instability of the formed cavity vortexes are suppressed.

4. The wall surface of claim 1, wherein each formed cavity vortex has a Reynolds number (Re), relative to the cavity height, velocity of the fluid over the wall surface, and the kinematic viscosity of the fluid, in the range of between 9,000 and 11,000, such that the instability of the formed cavity vortexes are suppressed.

5. The wall surface of claim 1, wherein the at least one selected angle comprises acute angles.

6. The wall surface of claim 5, wherein the at least one selected angle comprises a normal angle such that at least one of the roughness elements extends substantially normal to the wall surface.

7. The wall surface of claim 6, wherein the array of roughness elements are positioned in successive ridges of roughness elements, wherein each ridge of roughness elements is positioned substantially transverse to the flow of fluid across the wall surface, and wherein each ridge of roughness elements forms a substantially saw tooth pattern of roughness elements having a selected wavelength.

8. The wall surface of claim 7, wherein one cavity of the plurality of cavities is formed between adjacent successive ridges of roughness elements.

9. The wall surface of claim 8, wherein the distance between adjacent successive ridges is in a range between about 40 to 60% of the peak longitudinal height of the roughness elements.

10. The wall surface of claim 7, wherein a portion of the respective peripheral edges of the adjacent and aligned roughness elements in a ridge of roughness elements are connected and define a channel between portions of the bases and the bottom portions of the peripheral edges of the adjacent and adjoined roughness elements.

11. The wall surface of claim 10, wherein each channel extends longitudinally substantially co-axial to the flow of the fluid across the wall surface.

12. The wall surface of claim 7, wherein the front, upstream surface of each roughness element has a curved, convex cross-sectional shape relative to the flow of fluid toward the front surface.

13. The wall surface of claim 12, wherein the rear, downstream surface of each roughness element has a curved, concave cross-sectional shape relative to the flow of fluid toward the rear surface, the rear surface being configured to promote the recirculation of the flow within the cavity and to act as a streamlining effect in both stabilizing and promoting an embedded vortex flow field.

14. The wall surface of claim 13, wherein the top of each roughness element is positioned at an acute angle relative to the wall surface such that the tops of the roughness elements do not protrude into the fluid flow substantially normal to the flow direction.

15. The wall surface of claim 7, wherein the roughness elements in adjacent ridges of the array are positioned offset from each other relative to the flow of fluid across the surface.

16. The wall surface of claim 1, wherein the at least one riblet extending from the front, upstream surface and/or the at least one riblet extending from the rear, downstream surface comprise a plurality of riblets.

17. The wall surface of claim 16, wherein a trough is defined therebetween adjacent riblets that are recessed from the respective tips of the riblets.

18. The wall surface of claim 1, wherein adjacent roughness elements within a ridge of roughness elements have different scaled dimensions, such that the formed ridge has a staggered saw tooth appearance.

19. The wall surface of claim 1, wherein a juncture of two adjoining roughness elements acts as a center for each cavity vortex and is configured to allow for a secondary pair of vortices to form inside the larger cavity vortex, wherein the secondary pair of vortices interlock a plurality of formed cavity flows, formed between the respective roughness elements,
together in a substantially chain-link type array of streamlines that are relatively stable.

20. An aerodynamic or hydrodynamic wall surface configured to modify the interaction of a boundary layer of a fluid flowing across the wall surface, comprising:
at least one array of roughness elements disposed on and extending from the wall surface, the array of roughness elements are positioned in successive ridges of roughness elements, wherein each ridge of roughness elements is positioned substantially transverse to the flow of fluid across the wall surface, and wherein each ridge of roughness elements forms a substantially saw tooth pattern of roughness elements having a selected wavelength,
wherein each roughness element extends outwardly from the wall surface at one or more selected angles relative to the flow of fluid across the wall surface such that a preferential flow direction surface is formed, the at least one selected angle comprises acute angles,
wherein each roughness element has a front, upstream surface and an opposing rear, downstream surface and a peripheral edge that has an upper portion that tapers to a top and a bottom portion that tapers to a base, which is connected to the wall surface, the front, upstream surface having a curved, concave cross-sectional shape relative to the flow of fluid toward the front surface, and the rear, downstream surface having a curved, concave cross-sectional shape relative to the flow of fluid toward the rear surface that is configured to promote recirculation of the flow within the cavity and to act as a streamlining effect in both stabilizing and promoting an embedded vortex flow field,
wherein a plurality of roughness elements are positioned substantially transverse to the flow of fluid across the wall surface such that a distance between a medial portion of the peripheral edges of adjacent and aligned roughness elements is less than the distance between the respective tops of the roughness elements and is less than the distance between the respective bases of the roughness elements,
wherein the array of roughness elements defines a plurality of cavities,
wherein the preferential flow direction surface is configured for passively resisting flow adjacent the wall surface that is flowing in a direction toward the rear surface,
wherein each roughness element comprises at least one riblet extending outwardly from the front, upstream surface, the at least one riblet being configured to aid in the formation and stability of cavity flows embedded between the roughness elements, and
wherein each roughness element comprises at least one riblet extending outwardly from the rear, downstream surface of the roughness element, and wherein each rear surface extending riblet extends substantially longitudinally.

* * * * *